(12) United States Patent
Sato

(10) Patent No.: US 7,726,828 B2
(45) Date of Patent: Jun. 1, 2010

(54) PLANAR ILLUMINATION LIGHT SOURCE DEVICE AND PLANAR ILLUMINATION LIGHT DEVICE USING THE PLANAR ILLUMINATION LIGHT SOURCE DEVICE

(75) Inventor: Eiichi Sato, Hachioji (JP)

(73) Assignee: OPTO Design, Inc. (JP)

( * ) Notice: Subject to any disclaimer, the term of this patent is extended or adjusted under 35 U.S.C. 154(b) by 122 days.

(21) Appl. No.: 12/087,800

(22) PCT Filed: Jan. 22, 2007

(86) PCT No.: PCT/JP2007/050927

§ 371 (c)(1),
(2), (4) Date: Jul. 15, 2008

(87) PCT Pub. No.: WO2007/086347

PCT Pub. Date: Aug. 2, 2007

(65) Prior Publication Data

US 2009/0003002 A1    Jan. 1, 2009

(30) Foreign Application Priority Data

Jan. 27, 2006 (JP) ............................. 2006-018593
Apr. 10, 2006 (JP) ............................. 2006-107252
Jun. 23, 2006 (JP) ............................. 2006-173675
Dec. 25, 2006 (JP) ............................. 2006-348670

(51) Int. Cl.
*G09F 13/04* (2006.01)

(52) U.S. Cl. ............... 362/97.3; 362/97.1; 362/609; 362/341

(58) Field of Classification Search ........... 362/97.1, 362/97.2, 97.3, 612, 609, 341
See application file for complete search history.

(56) References Cited

U.S. PATENT DOCUMENTS 4,345,308 A * 8/1982 Mouyard et al. ............ 362/332

(Continued)

FOREIGN PATENT DOCUMENTS

JP    63010103    1/1988

(Continued)

OTHER PUBLICATIONS

"Application Serial No. PCT/JP2007/050927, International Preliminary Report on Patentability mailed Apr. 1, 2008", (w/ English Translation),24 pgs.

(Continued)

*Primary Examiner*—Ali Alavi
(74) *Attorney, Agent, or Firm*—Schwegman, Lundberg & Woessner, P.A.

(57) ABSTRACT

The present invention provides a planar illumination light source device by which uniform illumination light can be obtained over a wide area without increasing the thickness of LEDs in the radiation direction even when a highly directional light source such as LEDs is used, and a planar illumination device using this. The present invention includes a highly directional light source, a light guiding body having a radiation plane in a radiation direction of the light source, a casing that encloses the light source and seals planes other than the radiation plane of the light guiding body, inside reflection means provided in the entirety of the area between the casing and the light guiding body, and radiation side reflection means provided on the radiation plane and reflecting light from the light source at a prescribed ratio. A light emitting diode group consisting of one or a plurality of light emitting diodes is used as the highly directional light source.

16 Claims, 34 Drawing Sheets

U.S. PATENT DOCUMENTS

| | | |
|---|---|---|
| 6,247,826 B1 | 6/2001 | Funamoto et al. |
| 7,152,988 B2 | 12/2006 | Hung |
| 7,255,462 B2 * | 8/2007 | Tseng ............ 362/330 |
| 7,611,262 B2 * | 11/2009 | Chang ............ 362/246 |
| 2004/0175562 A1 | 9/2004 | Hayashi et al. |
| 2005/0138852 A1 | 6/2005 | Yamauchi |
| 2005/0280756 A1 | 12/2005 | Kim et al. |

FOREIGN PATENT DOCUMENTS

| | | |
|---|---|---|
| JP | 8-153405 | 6/1996 |
| JP | 8153405 | 6/1996 |
| JP | 9236803 | 9/1997 |
| JP | 10170723 | 6/1998 |
| JP | 10-233112 A | 9/1998 |
| JP | 10233112 | 9/1998 |
| JP | 10268786 | 10/1998 |
| JP | 11086620 | 3/1999 |
| JP | 2000250032 | 9/2000 |
| JP | 2001351424 | 12/2001 |
| JP | 2002231037 | 8/2002 |
| JP | 2002298629 | 10/2002 |
| JP | 2002343124 | 11/2002 |
| JP | 2003001737 | 1/2003 |
| JP | 2003-123526 A | 4/2003 |
| JP | 2003100133 | 4/2003 |
| JP | 2003186427 | 7/2003 |
| JP | 2003-270415 A | 9/2003 |
| JP | 2004-006317 | 1/2004 |
| JP | 2004006317 | 1/2004 |
| JP | 2004311353 | 11/2004 |
| JP | 2004349251 | 12/2004 |
| JP | 2005077898 | 3/2005 |
| JP | 2005284283 | 10/2005 |
| JP | 2005352426 | 12/2005 |
| JP | 2006012818 | 1/2006 |
| WO | WO-2005121879 A1 | 12/2005 |

OTHER PUBLICATIONS

"Application Serial No. PCT/JP2007/050927, International Search Report mailed Feb. 13, 2007", (w/ English Translation), 4 pgs.

"Application Serial No. PCT/JP2007/050927, Written Opinion mailed Feb. 13, 2007", 6 pgs.

"Japanese Application Serial No. 2006-348670, Notice of Rejection Grounds mailed Nov. 25, 2008", (w/ English Translation), 8 pgs.

* cited by examiner

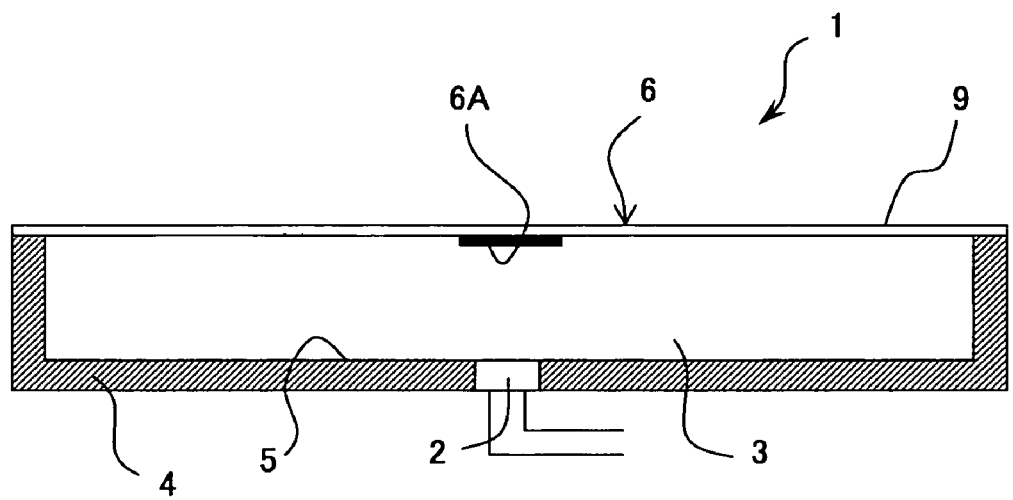
F I G. 2 A
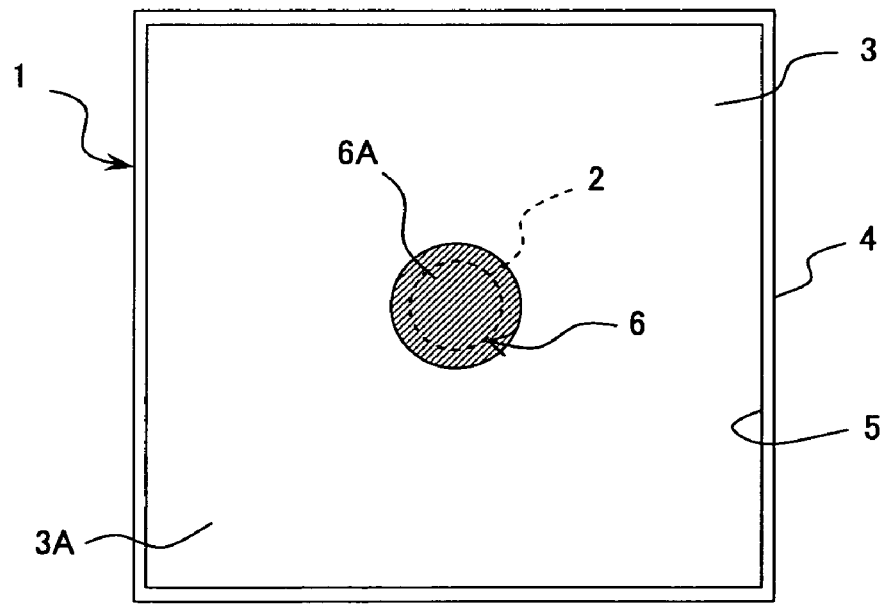
F I G. 2 B

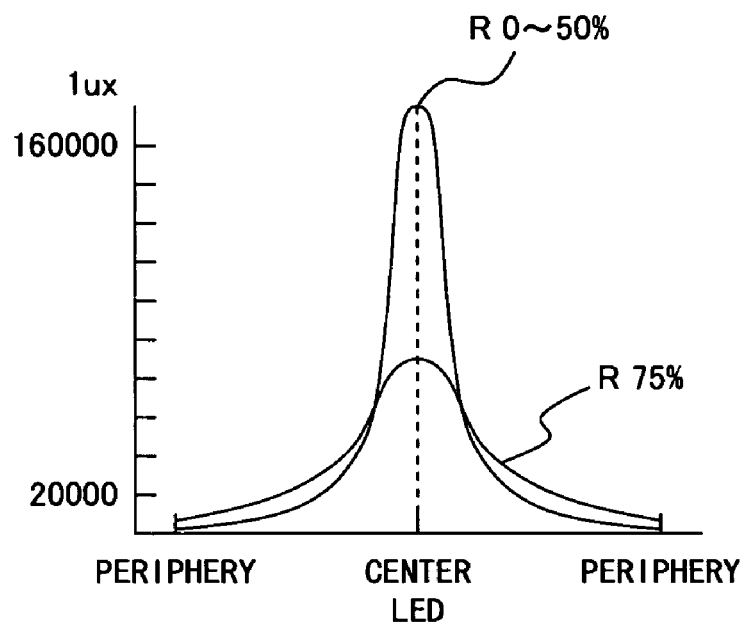
F I G. 2C
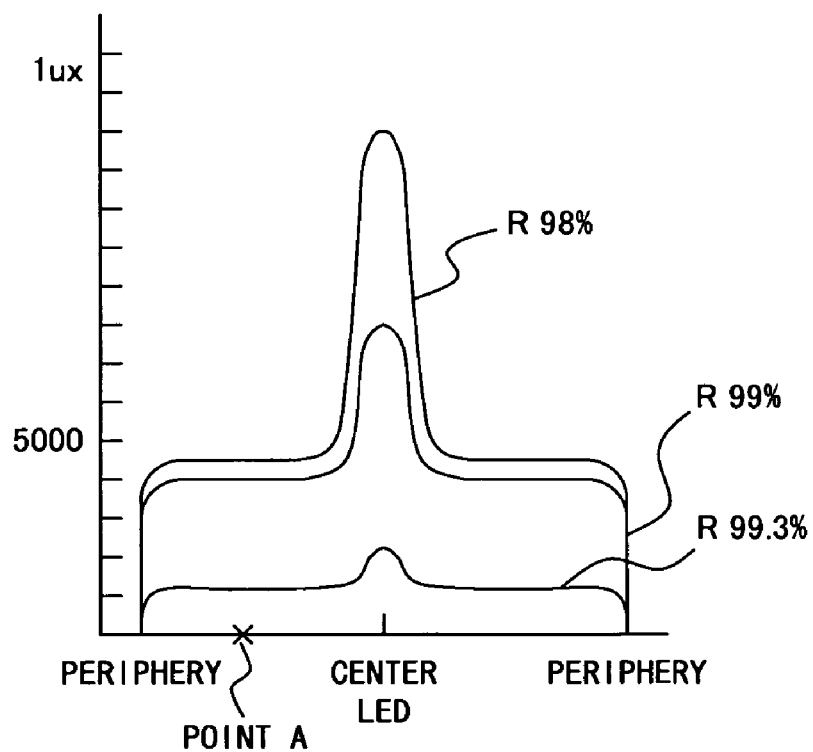
F I G. 2D

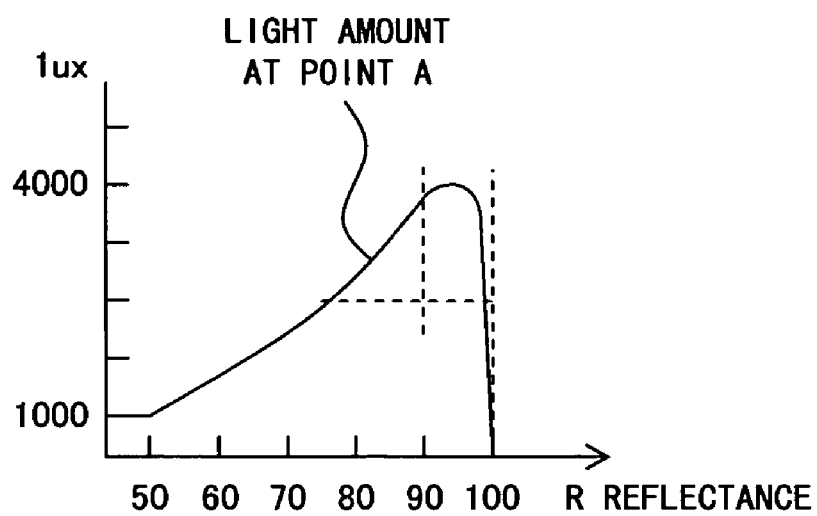
F I G. 2 E
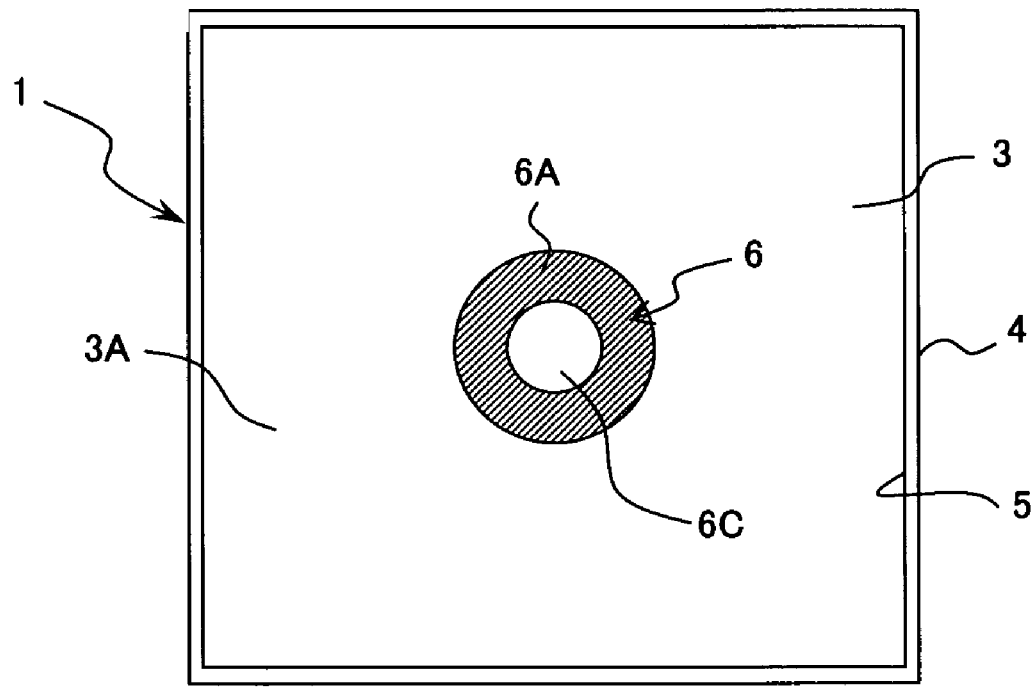
F I G. 2 F

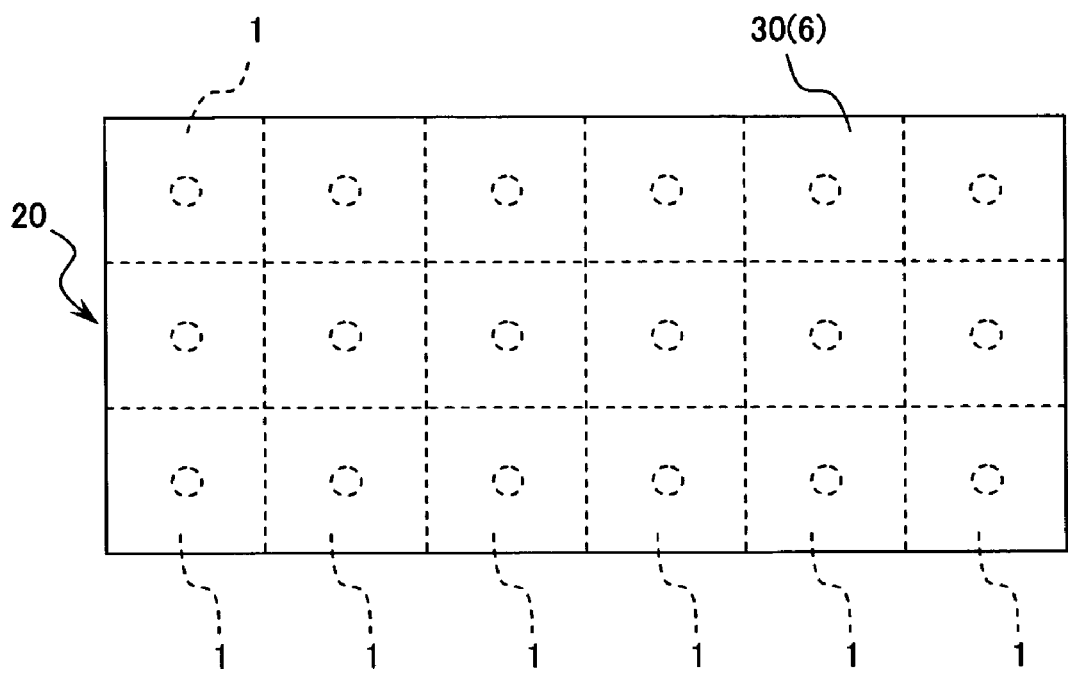
F I G. 7A
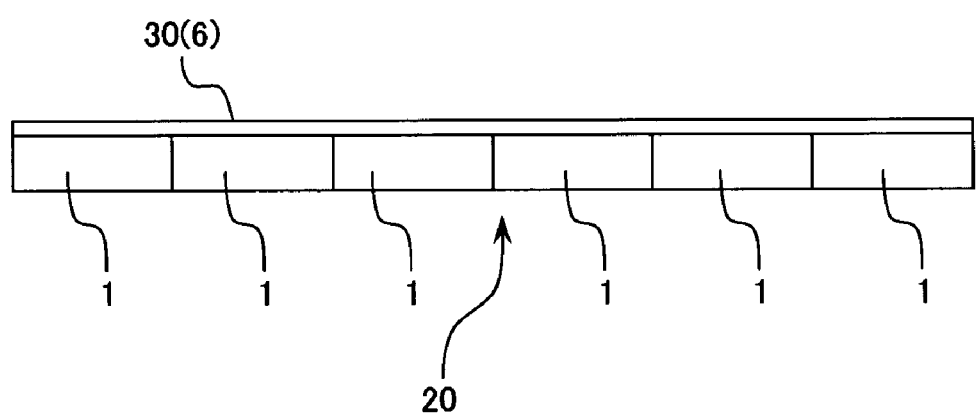
F I G. 7B

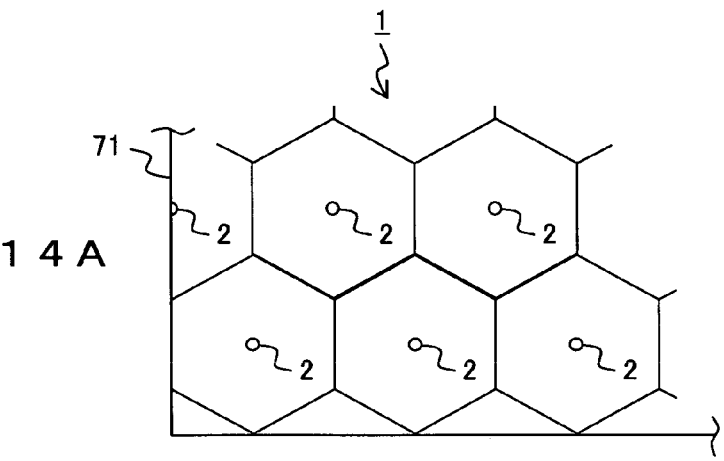
F I G. 14A
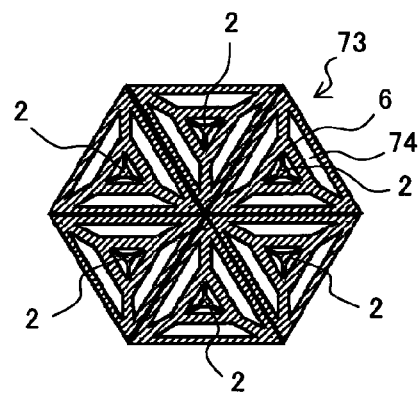
F I G. 14B
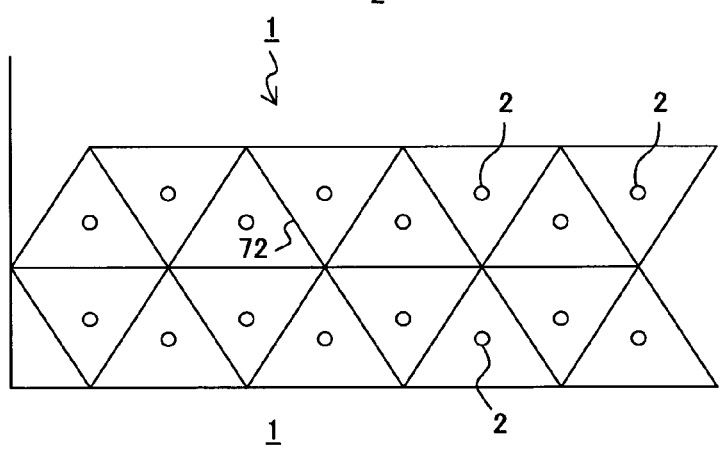
F I G. 14C
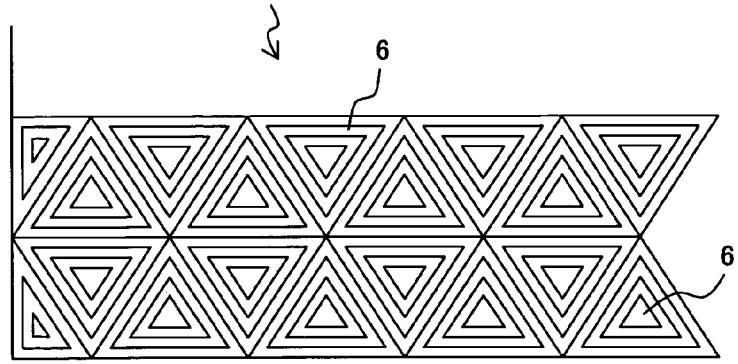
F I G. 14D

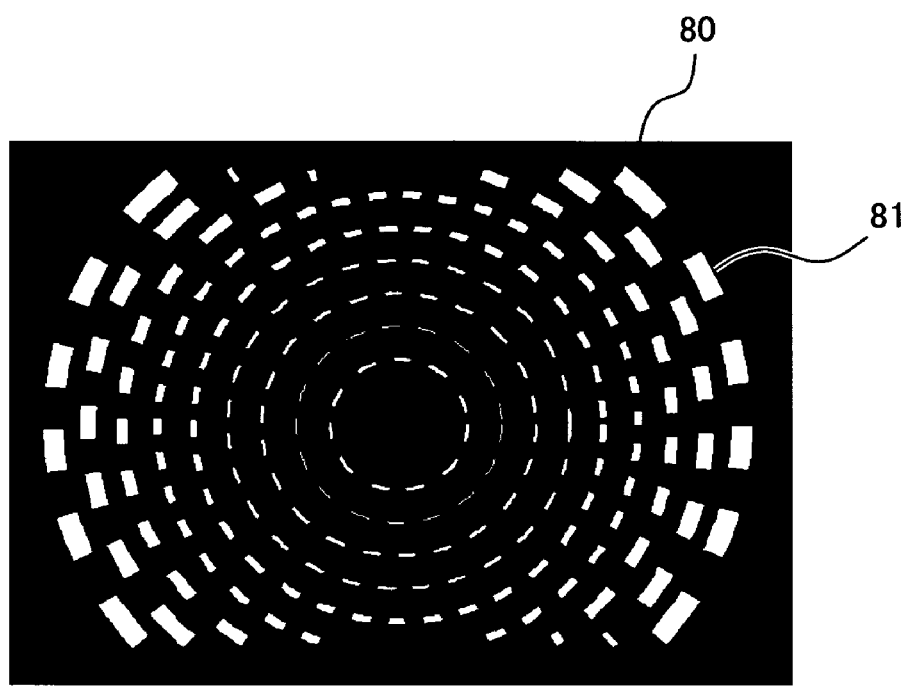
F I G. 1 5

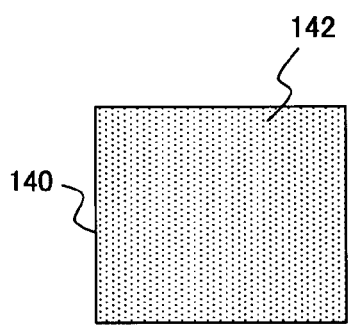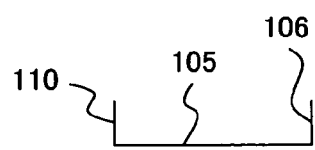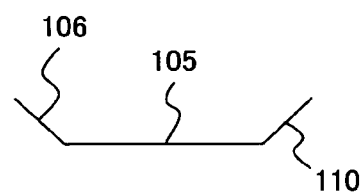
F I G. 1 9 A    F I G. 1 9 B    F I G. 1 9 C

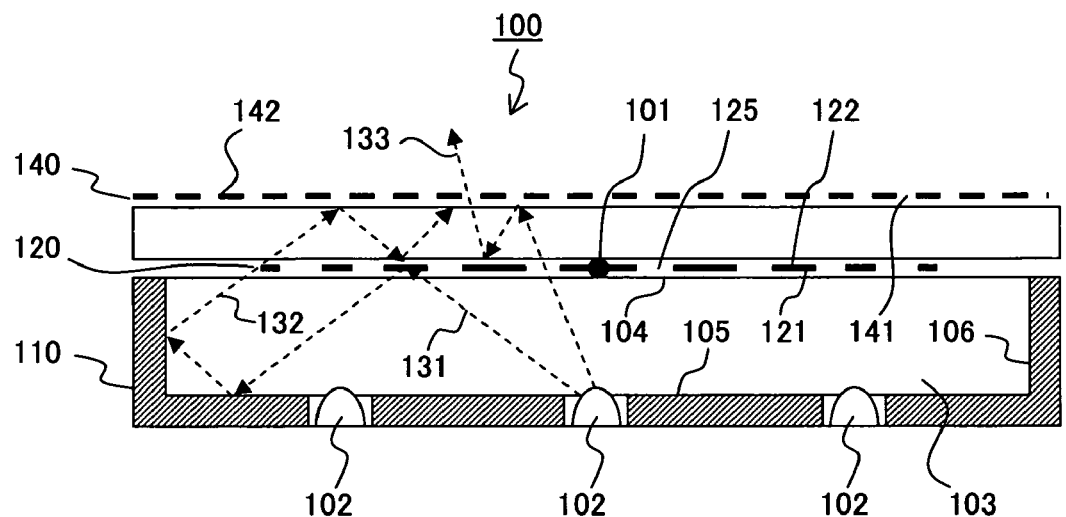
F I G. 20A
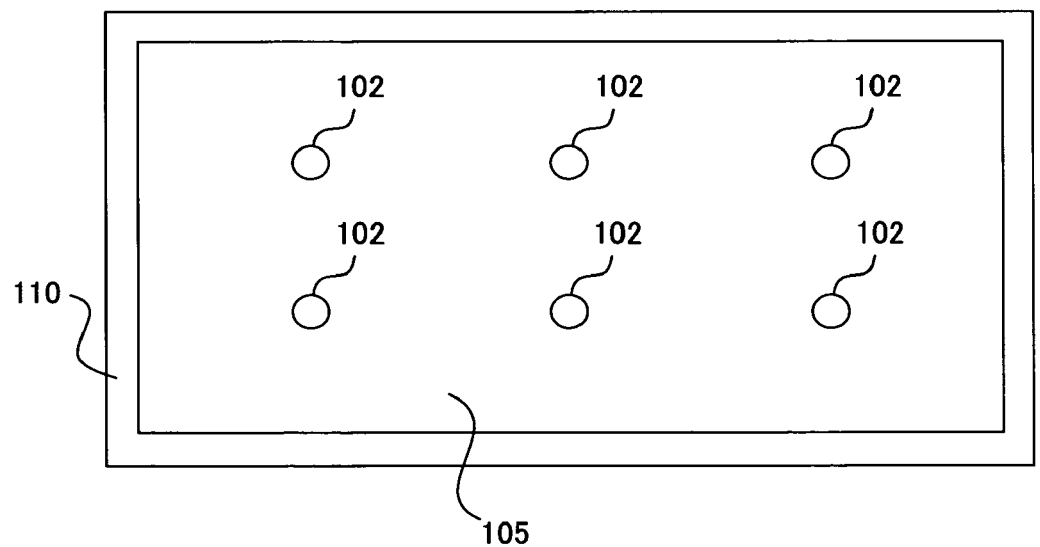
F I G. 20B

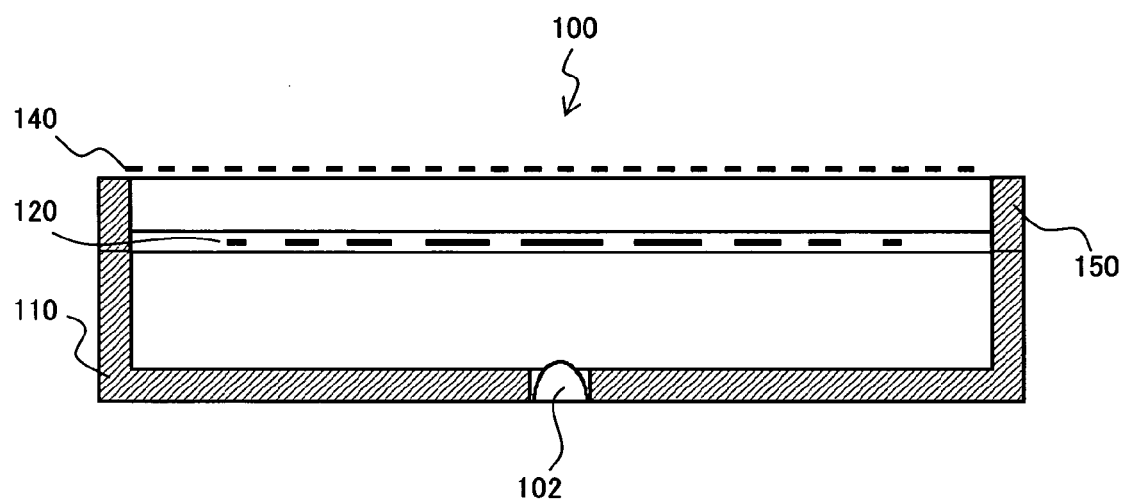
F I G. 2 1

FIG. 22A
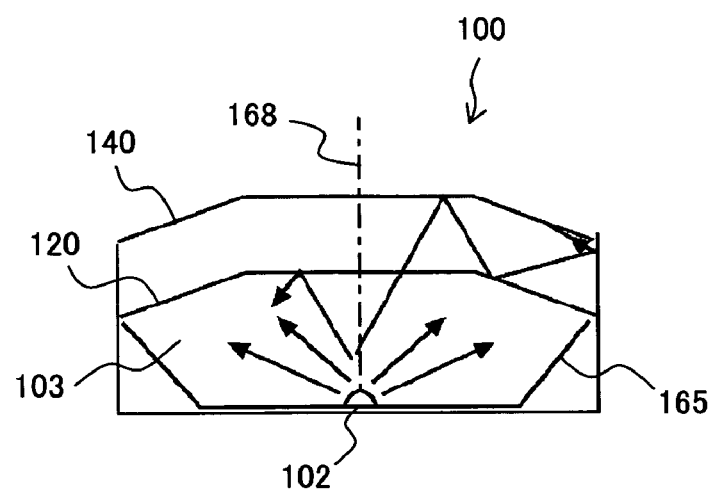
FIG. 22B
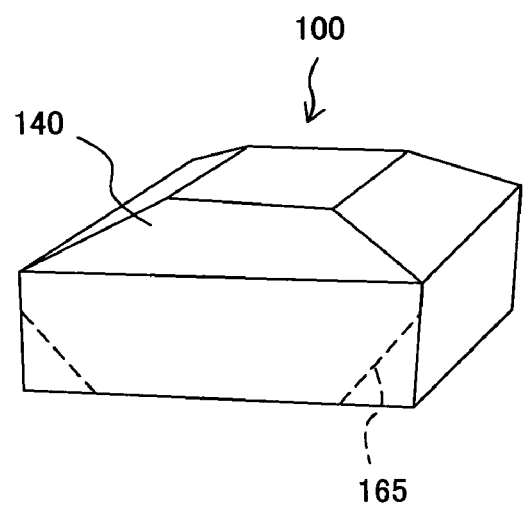
FIG. 22C
FIG. 22D
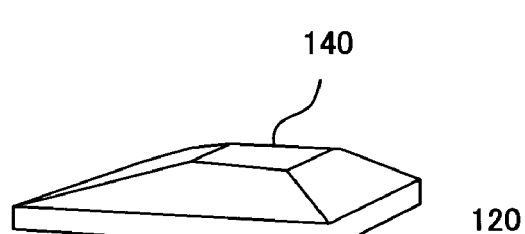
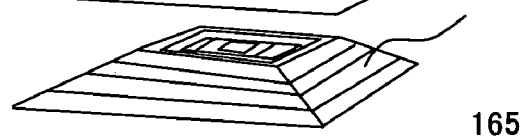
FIG. 22E
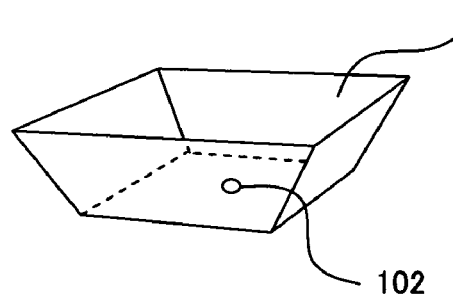

F I G. 2 5 A
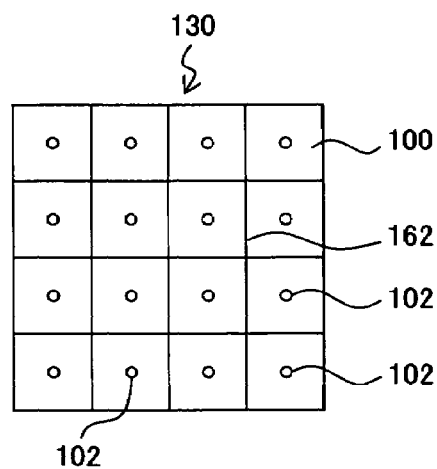
F I G. 2 5 B
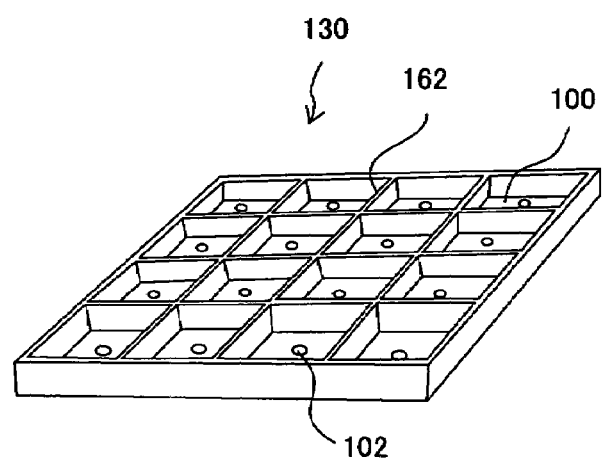
F I G. 2 5 C
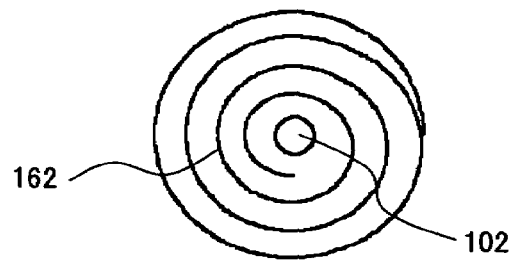
F I G. 2 5 D
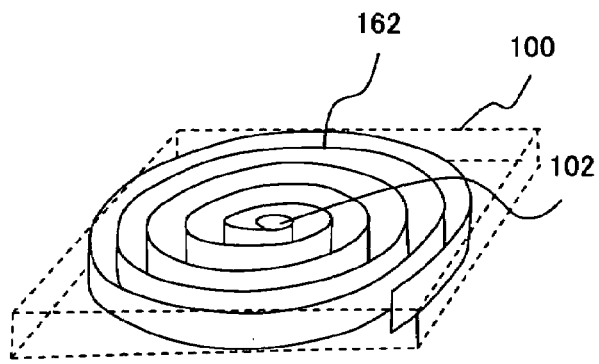

F I G. 2 7 A
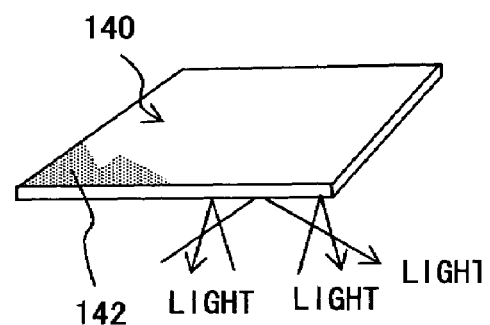
F I G. 2 7 B
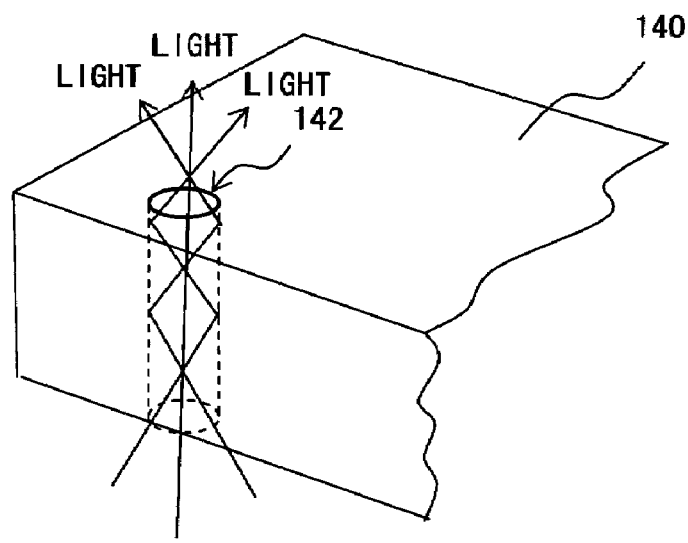

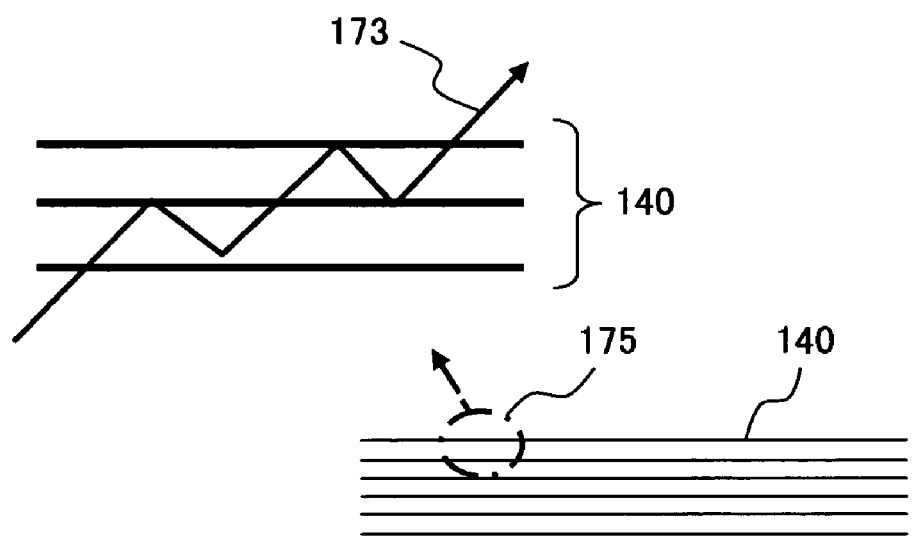
F I G. 28

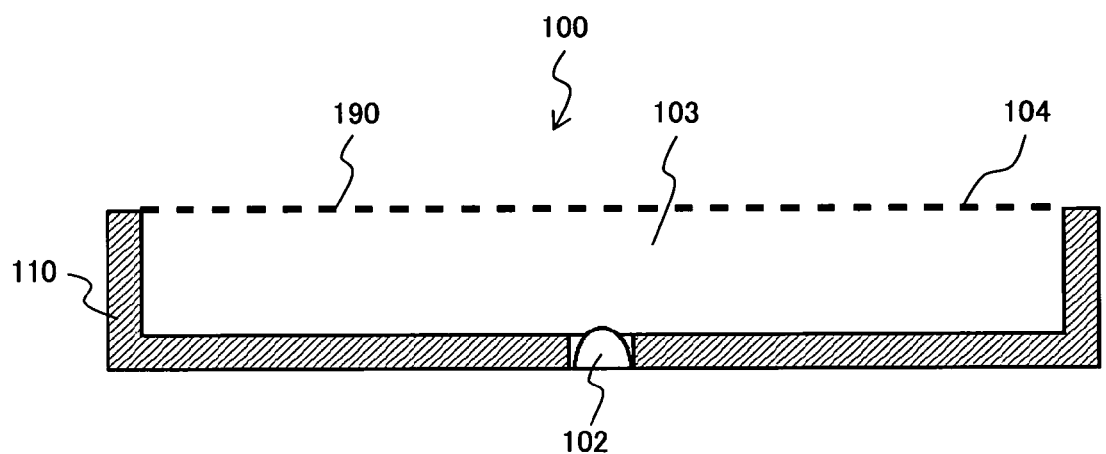
F I G. 30

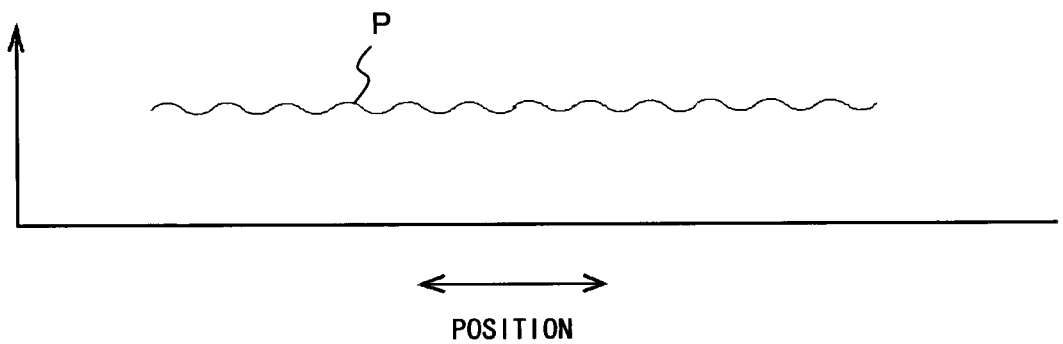
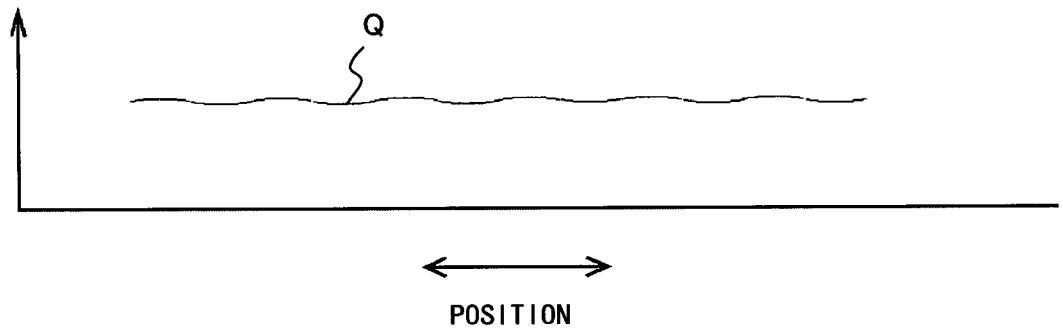
F I G. 3 1

PLANAR ILLUMINATION LIGHT SOURCE DEVICE AND PLANAR ILLUMINATION LIGHT DEVICE USING THE PLANAR ILLUMINATION LIGHT SOURCE DEVICE

RELATED APPLICATION

This application is a nationalization under 35 U.S.C. 371 of PCT/JP2007/050927, filed Jan. 22, 2007 and published as WO 2007/086347 A1 on Aug. 2, 2007, which claimed priority under U.S.C. 119 to Japanese Application No. 2006-018593, filed Jan. 27, 2006; Japanese Application No. 2006-107252, filed Apr. 10, 2006; Japanese Patent Application No. 2006-173675, filed Jun. 23, 2006; and Japanese Patent Application No. 2006-348670, filed Dec. 25, 2006, which applications and publication are incorporated herein by reference and made a part hereof.

TECHNICAL FIELD

The present invention relates to a planar illumination light source device used for LCD back light devices, illumination boards, display devices such as those for automobiles, vehicles, or the like, and also to a planar illumination light device using the planar illumination light source device.

BACKGROUND ART

A planar illumination light source device according to Patent Document 1 includes at least one primary light source and a plate-shaped light guiding body that guides the light emitted from the primary light source and that has a light-incident-end face on which the light emitted from the primary light source is incident and a light emission plane for emitting light to be guided; the light guiding body has a light emission mechanism on at least one of the light emission faces and the back face thereof, and also has at least one local lens array formation part on at least one of the light emission faces and the back face thereof, each of the local lens array formation parts has at least one local lens array, and the local lens array is formed in a direction different from the direction of a peak light intensity within a brightness distribution at an incident position of a highest light intensity of light emitted from the primary light source, the direction further being incident on the light incident end face. Thereby the inconsistency in brightness is solved.

An illumination display device according to Patent Document 2 includes a lamp housing having an opening on one end and having a light source device accommodation portion whose inner wall is a light reflection plane, a light emitting diode that is a light source for illumination provided on a bottom wall of the light source accommodation portion, and a display plate having a transmissive plate that is provided to cover the opening in order to display a desired display, and a light guiding body being fit between the light emitting diode and the display plate in the light source accommodation portion in order to form a contact plane together with the inner wall of the light source accommodation portion and in order to make incident light scatter and to make it a planar illumination light in which the texturing process is performed on the inner wall surface. Thereby, the light of a light source having a high directionality such as that of an LED is uniformized in order to increase the visibility of the display.

In other words, in the technique of Patent Document 2, light emitted from a light emitting diode is diffused and reflected by using an inner wall that has received the texturing process, and is uniformized by using the operation of a diffusion film or the like.

Also, in Patent Document 3, it is disclosed that reflection is repeated between the light reflected from a micro reflection part in a diffusion layer formed on a reflection plane of light and a reflector provided in the vicinity of a light emitting diode (LED), thereby uniformized light is obtained.

Also, in Patent Document 4, it is disclosed that directional light emitted from an LED (especially intensive light directly above the LED) is reflected in the direction of the LED by using a reflection part formed on a radiation plane. Thereby, the direction of the light is changed, and the intensity of the light from the LED is reduced in order to obtain uniformized light.

Patent Document 1:

Japanese Patent Application Publication No. 2002-343124

Patent Document 2:

Japanese Patent Application Publication No. 2003-186427

Patent Document 3:

Japanese Patent Application Publication No. 2005-284283

Patent Document 4:

Japanese Patent Application Publication No. 2006-12818

DISCLOSURE OF THE INVENTION

Use light emitting diodes (LEDs) as light source devices for display devices, illumination devices, and the like is discussed because LEDs consume less electricity and generate less heat. However, LEDs have high directionality, and thus require ingenuity, as disclosed in the above Patent Documents, in order to attain uniform light distribution over a wide area.

However, in the technique disclosed in Patent Document 1, in order to uniformize highly directional light emitted from an LED, an LED light source is provided in such a manner that the LED light source is perpendicular to the radiation direction. Accordingly, a large space is required.

In the technique disclosed in Patent Document 2, a prescribed thickness is required in the radiation direction of an LED. Also, the light emitted from an LED is not intended to be utilized entirely. For example, the light scattered by the inner diffusion film is absorbed by a base plate.

Also, in the technique disclosed in Patent Document 3, a reflection plate is provided on a bottom plane around a radiation plane and an LED; however, such a reflection plate is not provided on a side plane. Accordingly, it is not possible to obtain uniform illumination light while the light emitted from the LED is utilized entirely in a space surrounding the LED.

Further, the technique disclosed in Patent Document 4 is based on an idea of obtaining uniform illumination by controlling travelling paths of light emitted from an LED. In other words, a reflection part on a radiation plane is used for changing the traveling direction. However, this configuration reduces the light intensity, and it is not possible to obtain uniform light by using the effect of multipath reflection.

In view of the above situation, it is an object of the present invention to provide a planar illumination light source device that can obtain illumination light that is uniform over a wide area without increasing the thickness of an LED in the radiation direction, and without leaving a bright spot at a spot immediately above the radiation side reflection part covering the point-light source, while not making the spot dark, while utilizing the light highly efficiently even when the light source has as high a directionality as LEDs have, and to provide a planar illumination light device using this planar illumination light source device.

Accordingly, a planer illumination light source device of the present invention includes: a highly directional point-light source; a casing having a bottom plane and side planes of prescribed sizes, and formed with an opening, the casing having, at an inner wall surface thereof, an inside reflection part and a side reflection part that reflect or irregularly reflect light; and radiation side reflection means that covers the opening and transmits, reflects or irregularly reflects light.

The casing is provided with the point-light source arranged at the center of the bottom plane thereof. The radiation side reflection means has a central reflection part in a prescribed area at a spot immediately above the point-light source and an outward reflection part arranged at an outer periphery of the central reflection part. The outward reflection part is formed of a reflection member having a prescribed reflectance that transmits, reflects, or irregularly reflects a part of light, while the central reflection part is formed of a light transmissive reflection part having a higher reflectance than that of the outward reflection part.

With the configuration, illumination light can be obtained that is uniform over a wide area without increasing the thickness of an LED in the radiation direction while utilizing the light highly efficiently even when the light source has as high a directionality as LEDs have without leaving a bright spot at a spot immediately above the radiation side reflection member covering the point-light source, while not making the spot dark. Further, the inner wall surface of the casing reflects or irregularly reflects light, while the radiation side reflection means transmits, reflects, or irregularly reflects light. Therefore, light from the point-light source can be reflected, irregularly reflected, or transmitted by or through the casing or the radiation side reflection means to achieve the desired goal.

In the planer illumination light source device according to the present invention, the reflectance of the outward reflection part of the planer illumination light source device according to the present invention may preferably be set within the range of 75% to 99.3%. Thereby, the light distribution of the outward reflection part can be made flat.

In the planer illumination light source device according to the present invention, the point-light source is preferably formed of a light emitting diode group consisting of one or a plurality of light emitting diodes.

In the planer illumination light source device according to the present invention, the central reflection part may preferably have a slit or an opening a part thereof. Alternatively, the central reflection part may preferably be made thin. Thereby, no bright spot is left at the central reflection part, while not making the central reflection part dark.

In the planer illumination light source device according to the present invention, the outward reflection part may preferably have a slit that makes the amount of light transmitted therethrough increase as a distance from the central reflection part increases.

Thereby, a uniform illumination light can be obtained from the outward reflection part.

In the planer illumination light source device according to the present invention, both the central reflection part and the outward reflection part may be formed of reflection dots. The central reflection part may consist of reflection dots of a higher density distribution than that of the reflection dots of the outward reflection part.

In the planer illumination light source device according to the present invention, the casing may be rectangle.

In the planer illumination light source device according to the present invention, the side planes of the casing may preferably extend outward from the ends of the bottom plane. Thereby, extra spaces are formed at the ends of the bottom plane. The extra spaces can be used as spaces for, e.g., structural materials, electric wiring, or the like.

In the planer illumination light source device according to the present invention, the inside reflection part, the side reflection part, and the radiation side reflecting means may preferably be ultrafinely formed reflection members. Thereby, light emitted from the point-light source can be utilized highly efficiently (e.g., 94%) even when the point-light source has as high a directionality as LEDs have.

In the planer illumination light source device according to the present invention, the inside reflection part and the side reflection part may preferably be ultrafinely formed reflection members and the radiation side reflecting means may preferably be an application film containing particulates of titanium white or poly fluoro carbon. Thereby, light emitted from the point-light source can be utilized highly efficiently (e.g., 93%) even when the point-light source has as high a directionality as LEDs have.

In the planer illumination light source device according to the present invention, the inside reflection part and the side reflection part may preferably be application films containing particulates of titanium white or poly fluoro carbon and the radiation side reflecting means may preferably be an application film containing particulates of poly fluoro carbon. Thereby, light emitted from the point-light source can be utilized highly efficiently (e.g., 90% or more) even when the point-light source has as high a directionality as LEDs have.

In the planer illumination light source device according to the present invention, the casing may be preferably provided with a plurality of such point-light sources arranged inside and the radiation side reflecting means is arranged immediately above each of the point-light sources. Thereby, by arranging a plurality of point-light sources, a planer illumination light source device that emits even illumination light can be configured.

In the planer illumination light source device according to the present invention, an interior of the casing may preferably be divided into a plurality of blocks. One point-light source is arranged at the center of the bottom plane of each of the divided blocks and the radiation side reflecting means is arranged immediately above each of the point-light sources. Thereby, by arranging a plurality of point-light sources at the casing, a planer illumination light source device that emits even illumination light can be configured.

In the planer illumination light source device according to the present invention, the point-light source of the planer illumination light source device according to the present invention may include light emitting elements of red, blue, and green.

A plurality of any of the above planer illumination light source devices are arranged in a planer illumination device according to the present invention. Thereby, by arranging a plurality of planer illumination light source devices, a planer illumination device that emits even illumination light can be configured.

With the inventions related to the planer illumination light source devices, illumination light can be obtained that is uniform over a wide area without increasing the thickness of a point-light source in the radiation direction while utilizing the light highly efficiently even when the point-light source has a high directionality without leaving a bright spot at a spot immediately above the radiation side reflection means covering the point-light source, while not making the spot dark.

Also, by arranging a plurality of the planar illumination light source devices, a planar illumination light device that emits even illumination light can be configured.

BRIEF DESCRIPTION OF THE DRAWINGS

FIG. 2A is a schematic view showing a configuration of a radiation side reflection part according to a first embodiment;

FIG. 2B is a schematic view showing a configuration of a radiation side reflection part according to the first embodiment;

FIG. 2C shows a relationship between the reflectance and the luminance in the radiation side reflection part;

FIG. 2D shows a relationship between the reflectance and the luminance in the radiation side reflection part;

FIG. 2E shows a relationship between the amount of transmitted light and the reflectance at point A of the above configuration;

FIG. 2F shows an embodiment in which a central transmission part is provided at a radiation reflection part;

FIG. 7A is a schematic plan view of a planar illumination device according to a sixth embodiment;

FIG. 7B is a schematic front view of the above configuration;

FIG. 14A is a plan view of a planar illumination light source device in a polygonal shape according to a thirteenth embodiment;

FIG. 14B is a plan view of the above configuration according to another embodiment;

FIG. 14C is a cross sectional plan view of the above configuration according to still another embodiment;

FIG. 14D is a plan view of the above configuration according to yet another embodiment;

FIG. 15 is a plan view of a film having slits according to a fourteenth embodiment;

FIG. 19A is a plan view of second radiation side reflection means;

FIG. 19B is a longitudinal sectional view of inside reflection means;

FIG. 19C is a longitudinal sectional view of a variation example of the above configuration;

FIG. 20A is a longitudinal sectional view of a planar illumination light source device according to an eighteenth embodiment;

FIG. 20B is a cross-sectional plan view of the above configuration;

FIG. 21 is a longitudinal sectional view of a planar illumination light source device according to a nineteenth embodiment;

FIG. 22A is a schematic longitudinal sectional view in which shapes of the reflection body and the radiation side reflection means are changed;

FIG. 22B is a perspective view of the above configuration;

FIG. 22C is a perspective view of the second radiation side reflection means;

FIG. 22D is a schematic longitudinal sectional view in which shapes of the reflection body and the radiation side reflection means are changed;

FIG. 22E is a perspective view of a reflection body;

FIG. 25A is a sectional plan view of an arrangement of an object in which planar illumination light source devices are arranged;

FIG. 25B is a perspective view of the above configuration;

FIG. 25C shows a variation example of a partition;

FIG. 25D is a perspective view of the above configuration;

FIG. 27A shows operations of a variation example of the second radiation side reflection means;

FIG. 27B is a partially enlarged view of the above configuration;

FIG. 28 shows operations of another variation example of the second radiation side reflection means;

FIG. 30 is a longitudinal sectional view of a planar illumination light source device according to a twenty-second embodiment;

FIG. 31 shows operations of the second radiation side reflection means;

BEST MODES FOR CARRYING OUT THE INVENTION

Figure 1:
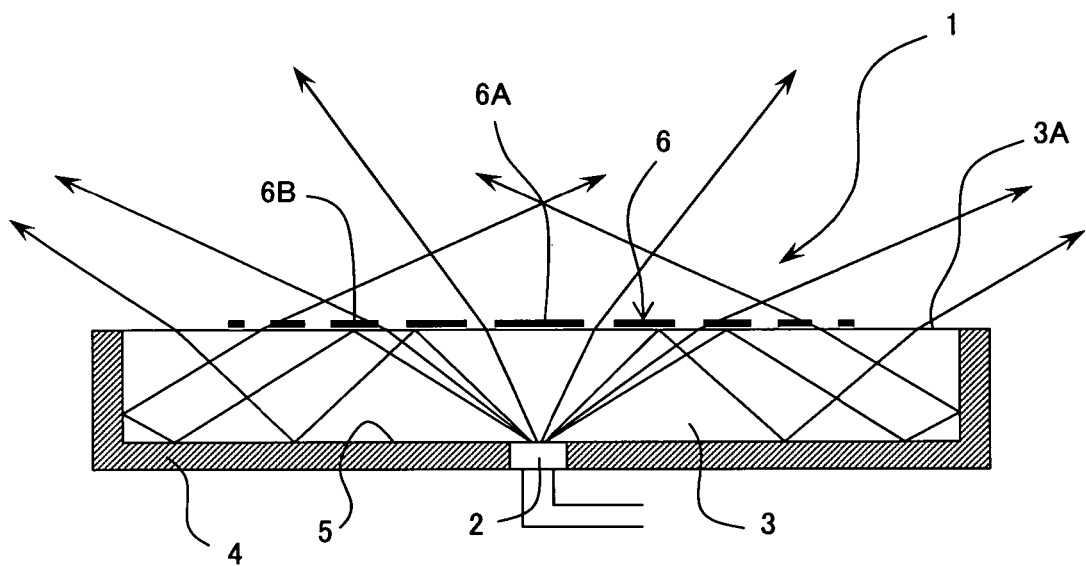
FIG. 1 is a schematic view showing a configuration of a planar illumination light source device according to the present invention.

Hereinafter, embodiments of the present invention will be explained by referring to the drawings.

As shown in, for example, FIG. 1, a planar illumination light source device 1 according to the present invention comprises a highly directional light source 2 that is a light emitting diode group having one or a plurality of light emitting diodes, a light guiding body 3 having a radiation plane 3A in a radiation direction of the light source 2, a casing 4 that encloses the light source 2 and also seals a plane of the light guiding body 3 entirely except for the radiation plane, and an inside reflection part 5 as inside reflection means is provided across the entirety of the space between the casing 4 and the light guiding body 3, and on the radiation plane 3A, a radiation side reflection part 6 as radiation side reflection means for reflecting the light from the light source 2 at a prescribed ratio is provided.

Also, for the inside reflection part 5 and the radiation side reflection part 6, materials that do not absorb light much are used. Also, the radiation side reflection part 6 as the radiation side reflection means may consist of many plates. These points are common in all the embodiments described below.

As described above, the casing 4 has the inside reflection part 5 on the bottom plane and the side reflection part on the side plane (not shown); accordingly, the light emitted from the light source 2 is not absorbed by these reflection parts, but is reflected in a manner of the multipath reflection. Thereby, the light emitted from the light source 2 is used almost entirely, and uniform illumination light is obtained.

Further, the side walls of the casing 4 can extend vertically in the upward direction, and also can extend upwardly to a greater area, as shown in FIG. 19C.

Also, the scope of the light source 2 includes elements that emit light from themselves such as light emitting diodes or laser diodes (LDs).

Further, FIG. 1 shows a case in which one light source 2 is arrange in the casing 4. However, it is possible to arrange a plurality of light sources 2 in the casing 4. The arrangement of the light sources 2 in this case can be a matrix, or can be a symmetrical arrangement with respect to one light source 2 arranged at the center (see FIG. 16, which will be described later). Even when a plurality of light sources 2 are arranged in the casing 4, it is possible to obtain uniform planar illumination without the light sources 2 being densely arranged.

The size and shape of the casing 4 and the radiation side reflection part 6 are important factors for obtaining uniform illumination.

Thus, the inventor conducted an experiment by using the casing 4, which is a 10 cm×10 cm×1.5 cm (height) cuboid, and an LED that emits light of 64 lm generally at one watt as the light source 2. In this case, the shape of the radiation side reflection part 6 was similar to the shape shown in FIG. 4A (which will be explained later).

Also, ultrafinely formed reflection plates were used as the inside reflection part 5 and the radiation side reflection part 6. Then, a diffusion body was disposed on the radiation side, and the luminance was measured after obtaining light uniform except for the influence caused by the shape of the radiation side reflection part 6. As a result of this, a luminance of 6000 lux was obtained. This means that ninety-four percent of the light emitted from the LED was utilized.

Next, the inventor conducted an experiment using the above described ultrafinely formed reflection plates as the inside reflection part 5. In this case, the inventor used, as the radiation side reflection part 6, a substance that was obtained by emulsifying particulates of titanium white. The shape of the radiation side reflection part 6 was made to be similar to the shape shown in FIG. 4A (this will be explained later) by using screen printing.

Under the above conditions, the luminance of the uniformized light was measured, and the result was 5830 lux. This means that ninety-one percent of the light emitted from the LED was utilized.

Further, when the inventor used particulates of poly fluoro carbon for the radiation side reflection part 6, a luminance of 5950 lux was obtained. This means that ninety-three percent of the light emitted from the LED was utilized.

Also, when particulates of titanium white and poly fluoro carbon were used as the inside reflection part 5, ninety percent or more of the light emitted from the LED was utilized.

In other words, according to the planar illumination light source device 1 of the present embodiment, almost ninety percent or more (close to one hundred percent) of the light emitted from the LED is utilized, while uniform illumination light can be obtained.

Also, in the explanation of the embodiments below, like numerals are used to denote like members or members causing like effects; accordingly, explanations thereof may be omitted.

First Embodiment

FIGS. 2A and 2B show the radiation side reflection part 6 according to the present embodiment. This radiation side reflection part 6 has, on the inner wall of the light transmissive substrate 9, a central reflection part 6A for reflecting, in a prescribed range, the light traveling straight forward from the light source 2. As the light transmissive substrate 9, a plate made of highly transmissive material such as glass, acrylic resin, or the like is used. A uniform reflection transmissive film is coated on this light transmissive substrate 9. As this reflection transmissive film, titanium oxide, magnesium nitride, or the like are used.

FIG. 2C shows the light distribution in the case when the coating film does not absorb much light and the reflectance R is 0% through 50% or 75%. Also, FIG. 2D shows the light distribution in the case when the coating film does not absorb much light and the reflectance R is 98% through 99.3%.

According to FIG. 2C, when the reflectance R is 0% through 50%, the luminance at a spot immediately above the light source 2 is locally high, and when the reflectance R is 75%, the luminance at that spot is not so high. Further, according to FIG. 2D, when the reflectance R is 98% through 99.3%, the distribution of the transmitted light at a peripheral point A of the light source 2 is flat. However, a bright spot is left at the central part.

FIG. 2E shows the relationship between the amount of light transmitted through point A of FIG. 2D and the reflectance R.

FIG. 2E shows that as the reflectance R increases, the light amount also increases.

Also, in order to utilize the above described bright-spot light, the central reflection part 6A is used to reflect a larger amount of light to the side of the light source 2, and the uniformity of the light can be increased. However, it is desirable to use a material that has a small transmissivity and does not absorb light as the central reflection part 6A. However, if the reflectance of the central reflection part 6A is too high, it becomes dark, and thus a material having a small transmittance and not absorbing much light is used as the central reflection part 6A. Alternatively, a small transmissive part is formed at the center of the central reflection part 6A or a thin film is formed in order to increase the uniformity of the light.

An experiment was conducted to measure the luminance of the uniformized light in the case when the central reflection part 6A is formed by arranging a diffusion body on the radiation plane side of FIG. 2A.

In this case, a cuboid of 10 cm×10 cm×1.5 cm (height) is used as the casing 4, and the ultrafinely formed reflection plate having a reflectance of eighty-eight percent was used as the coating film. Also, the diameter of the central reflection part 6A is Φ10, and a slit (transmitting part) in the form of "+" was formed at the center. Also, an LED that emits light of 43 lm was used as the light source 2.

Under the above condition, the planar illumination light source device 1 that emits the uniform light of 4101 lux was obtained. This means that ninety-three percent of the light emitted from the light source 2 was utilized.

Thereby, the amount of the light emitted from the highly directional light source 2 can be limited at the central part, and the entire amount of the light can be secured by the light reflected from the inside reflection part 5; accordingly, uniform illumination light can be obtained. Also, although in FIG. 2A the case in which the central reflection part 6A was formed on the inner side of the light transmissive substrate 9 is explained, it is also possible to form the central reflection part 6A on the outer side of the light transmissive substrate 9.

Also, as shown in FIG. 2F, it is also possible to provide a central light transmission part 6C at the central portion of the central reflection part 6A. This central light transmission part 6C can be an opening having a prescribed diameter or can be an object that is formed so as to yield a prescribed transmissivity. Also, in the case of the opening, it is possible to increase and decrease the light amount at the central portion by changing the diameter.

Also, the central reflection part 6A can be an object obtained by attaching a commonly known optical reflecting plate on the radiation plane 3A, and the central reflection part 6A can be formed by evaporating an optical reflecting plate when forming the light guiding body 3, and the producing method thereof is not particularly limited.

Further, the radiation side reflection part 6 can be a light diffusion plate made of a material such as ground glass or the like. In this case, the configuration is substantially the same as that shown in FIG. 30 (which will be explained later).

Also, the above light guiding body 3 can be formed of, for example, optical glass. Also, highly transmissive plastic such as acrylic resin or the like can be used. Further, by using flexible and transmissive plastic such as silicon resin or the like, it is possible to realize a planar illumination light source device that is curved entirely or partially, as will be explained later. Also, it may be gas or liquid. The reflection film can be easily formed by using commonly known resin or paint for forming a mirror plane. Accordingly, it is suitable for, for example, large advertisement display devices arranged on walls or the like of buildings. Production cost is reduced because the cost of materials is low, the processing is simple, and processing accuracy is allowed to be low.

Second Embodiment

Figure 3A:
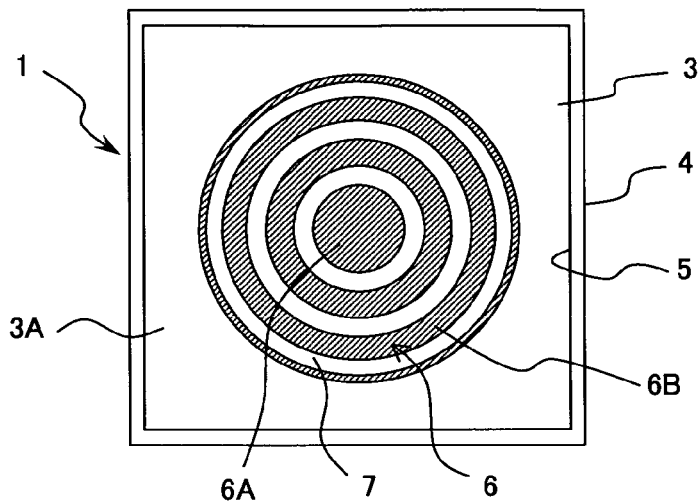
FIG. 3A schematically shows a configuration of a radiation side reflection part according to a second embodiment.
Figure 3B:
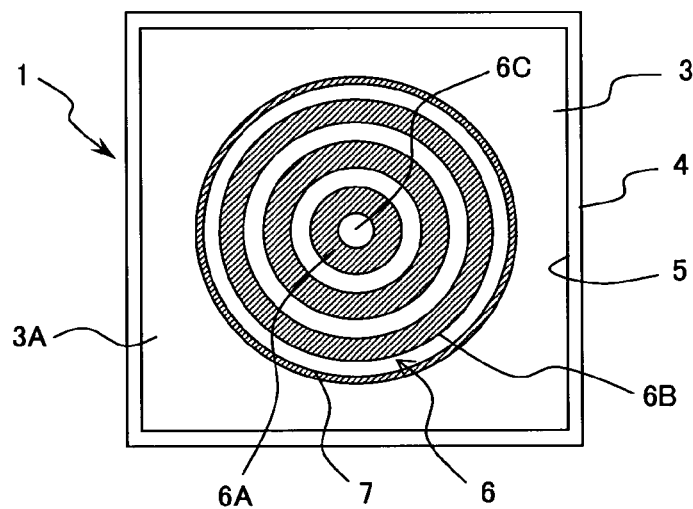
FIG. 3B schematically shows a configuration of the radiation side reflection part according to the second embodiment.
Figure 3C:
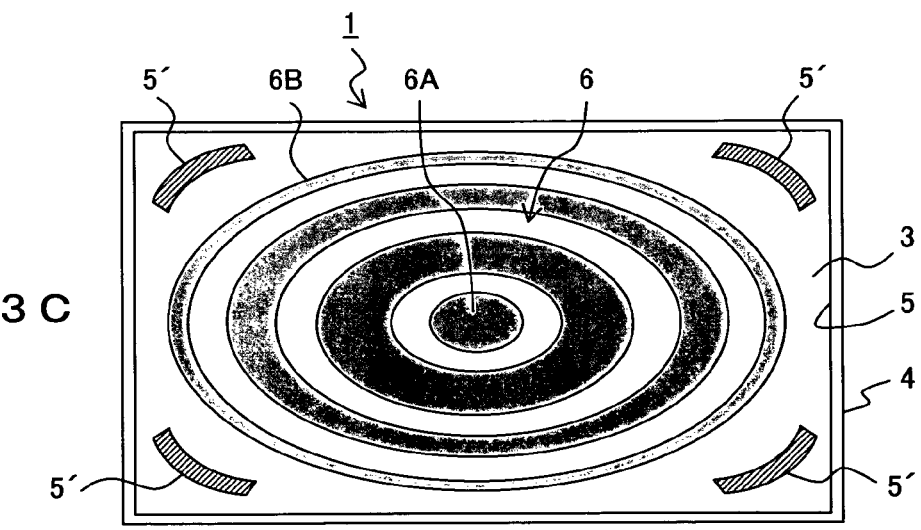
FIG. 3C schematically shows a configuration of the radiation side reflection part according to the second embodiment.

FIGS. 3A through 3C show the radiation side reflection part 6 according to the present embodiment.

As shown in FIG. 3A, the radiation side reflection part 6 includes a circular center reflection part 6A that is provided to the light guiding body 3, and a plurality of looped outward reflection parts 6B outwardly provided so that the outward reflection parts 6B draw concentric circles, at a prescribed interval, about the center of the central reflection part 6A. Thereby, outward light transmissive parts 7 are formed at a prescribed interval. Further, the central reflection part 6A is a circular reflection plate or a reflection film provided on the radiation plane 3A, and the outward reflection parts 6B are looped reflection plates or reflection films formed so that the outward reflection parts 6B draw concentric circles about this reflection plate or reflection film at a prescribed interval.

Also, in the present embodiment, the width of the reflection plates or reflection films constituting the outward reflection parts 6B are set so that the further out the plate or film is, the narrower the width of the plate of the film is. Thereby, it is possible to limit the amount of the transmitted light at the center portion having a great amount of light and to increase the amount of the transmitted light in the outer portions, and accordingly further uniformity of the illumination light is realized.

Also, in FIG. 3B, similarly to the first embodiment, it is possible to provide the central light transmission part 6C within a prescribed area around the central reflection part 6A. Thereby, it is possible to attain the same effect as that of the first embodiment.

Further, as shown in FIG. 3C, when the casing 4 is a rectangle, the central reflection part 6A is an ellipsoidal reflection plate or a reflection film provided on the radiation plane 3A. Also, the outward reflection parts 6B are ellipsoidal reflection plates or reflection films formed around the reflection plate or reflection film at a prescribed interval. Also, when the casing 4 is a rectangle, arc-shaped reflection members 5' are provided at the corners of the casing 4 in order to reflect light toward the center part of the casing 4. Thereby, it is possible to reflect light so that the reflected light fully reaches the corners without leaving a blind spot. The other points of the configuration are the same as in the first embodiment.

Third Embodiment

Figure 4A:
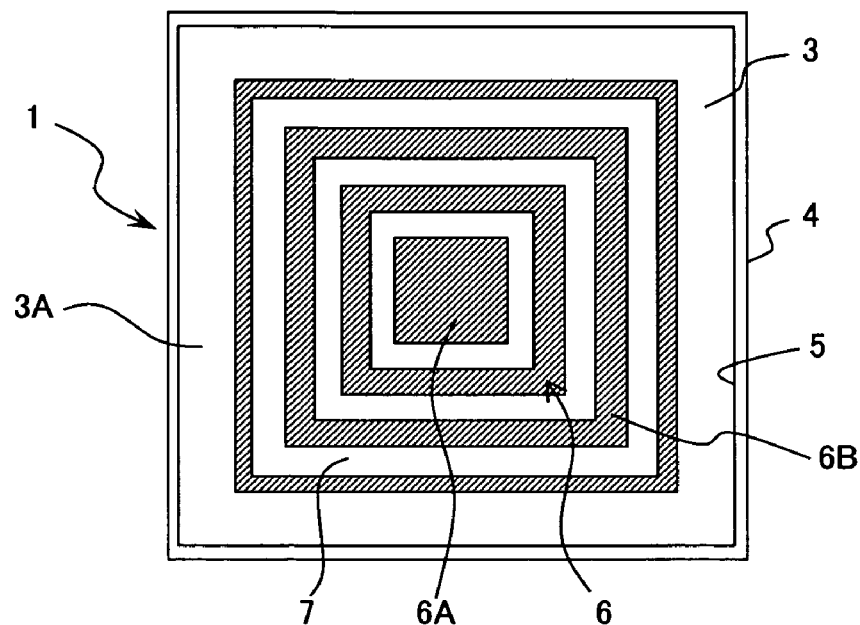
FIG. 4A schematically shows a configuration of the radiation side reflection part according to a third embodiment.
Figure 4B:
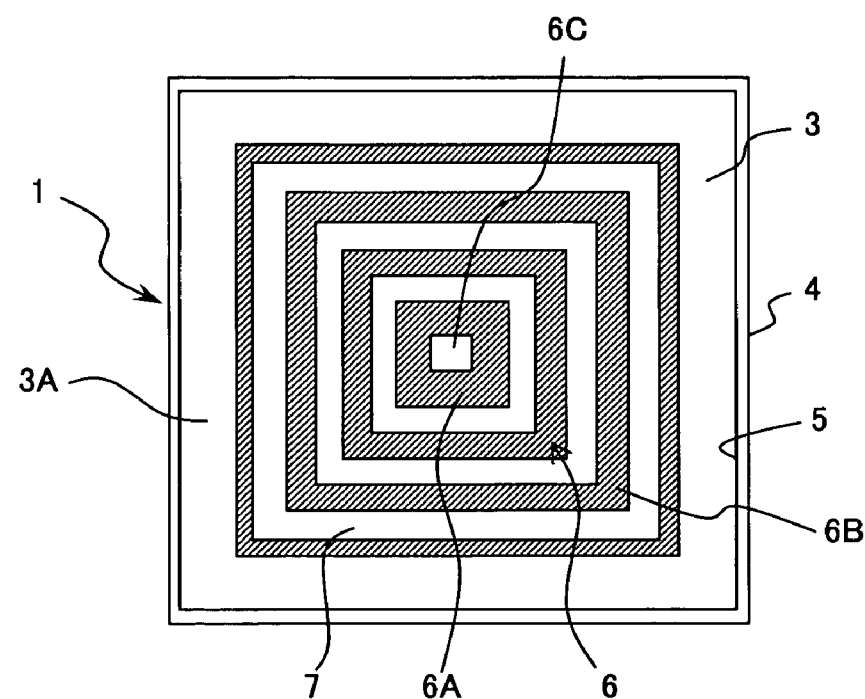
FIG. 4B schematically shows a configuration of the radiation side reflection part according to the third embodiment.

FIGS. 4A and 4B show the radiation side reflection part 6 according to the present embodiment.

As shown in FIG. 4A, the radiation side reflection part 6 has a rectangle-shaped central reflection part 6A formed to be similar to the casing 4 provided to the light guiding body 3, and a plurality of looped outward reflection parts 6B arranged around the central reflection part 6A outwardly at a prescribed interval. Thereby, the outward light transmissive parts 7 are formed at a prescribed interval.

Further, the central reflection part 6A is a reflection plate or reflection film formed, on the radiation plane 3A, to be similar to the casing 4. The outward reflection parts 6B are a belt-shaped reflection plate or reflection film formed on the reflection plate or reflection film at a prescribed interval.

Thereby, it is possible to limit the amount of the transmitted light at the center portion having a great amount of light and to increase the amount of the transmitted light in the outer portions, and accordingly further uniformity of the illumination light is realized.

Also, in FIG. 4B, similarly to the first embodiment, it is also possible to provide the central light transmission part 6C within a prescribed area around the central reflection part 6A. Thereby, it is possible to attain the same effect as that of the first embodiment.

Fourth Embodiment

Figure 5:
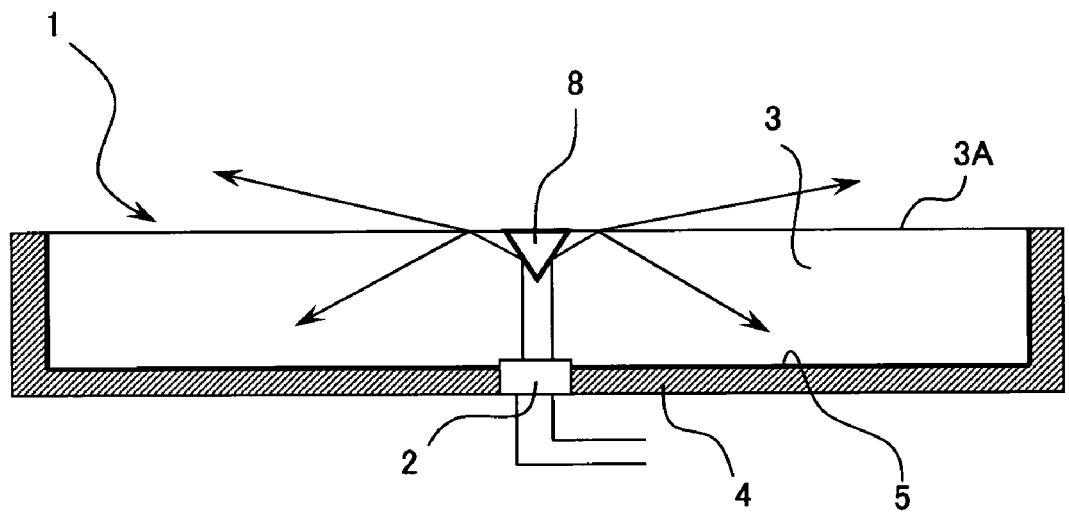
FIG. 5 schematically shows a configuration of the radiation side reflection part according to a fourth embodiment.

FIG. 5 shows the radiation side reflection part 6 according to the present embodiment.

In the present embodiment, the radiation side reflection part 6 is a conical reflection body 8 having a prescribed vertical angle provided on the radiation plane 3A in front of the light source 2. This reflection body 8 is desirably a cone that can uniformly reflect light or a pyramid-shaped body similar to the casing. Also, by setting the vertical angel thereof, it is possible to reflect all or a part of the light emitted from the light source substantially directly to the radiation plane. Thereby, it is possible to attain the same effect as that of the first embodiment.

Fifth Embodiment

Figure 6:
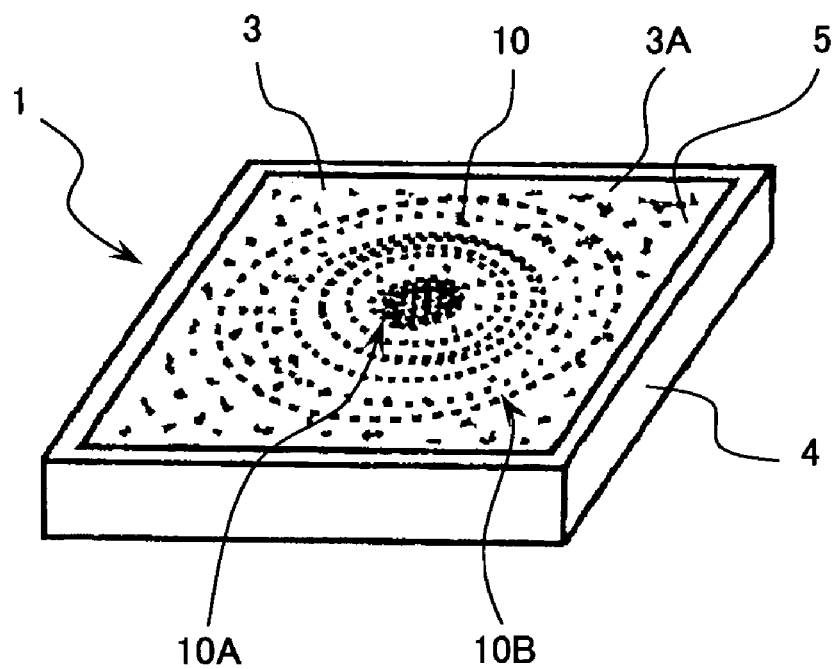
FIG. 6 schematically shows a configuration of the radiation side reflection part according to a fifth embodiment.

FIG. 6 shows the radiation side reflection part 6 according to the present embodiment.

In the present embodiment, radiation side reflection parts 10 are formed on reflection dots made of a reflecting material. These radiation side reflection parts 10 consist of a central side reflection part 10A consisting of reflection dots of a high density distribution, and an outward reflection part 10B consisting of reflection dots of a density distribution lower than that of the central side reflection part 10A. Thereby, it is possible to attain the same effect as that of the first embodiment.

Sixth Embodiment

FIGS. 7A and 7B show a planar illumination light device 20 formed of a plurality of the planar illumination light source devices 1. FIG. 7A is a plan view of the planar illumination light device 20. FIG. 7B is a front view thereof.

In other words, the planar illumination light device 20 is formed of a plurality of the planar illumination light source devices 1 according to the first through fifth embodiments so that the planar illumination light device 20 is formed to be of desirable size. Also, in this case, the uniformity of the illumination distribution of the planar illumination light device 20 is increased by providing a light diffusion plate 30 in front of the planar illumination light source device 1.

Seventh Embodiment

Figure 8:
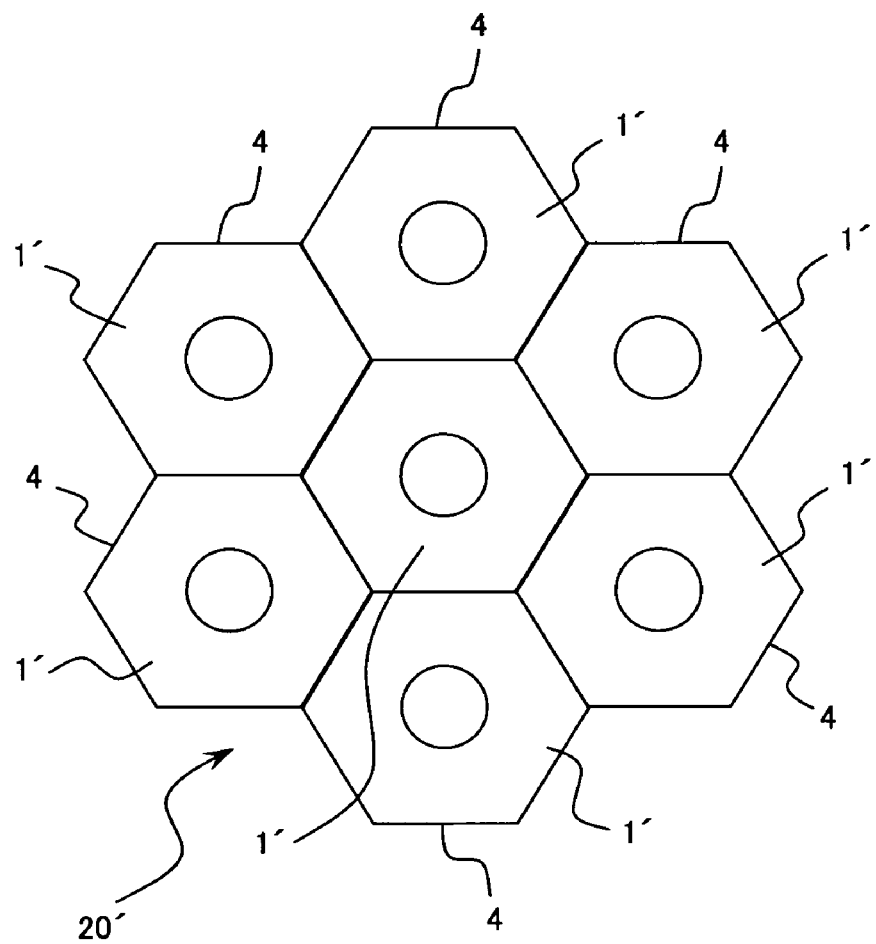
FIG. 8 schematically shows a configuration of a planar illumination light device according to a seventh embodiment.

FIG. 8 shows another embodiment of a planar illumination light device 20'.

In the present embodiment, the planar illumination light device 20' in the honeycomb configuration is realized by arranging a plurality of regularly hexagonal planar illumination light source devices 1'.

In other words, the light guiding body 3 of the planar illumination light source device 1 of the first through fifth embodiments is shaped to be regular hexagons. Also, the casing 4 is shaped to be regularly hexagonal, and the planar illumination light source device 1' that is regularly hexagonal in its entirety is formed. Also, it is possible to provide the light diffusion plate 30 in front of the planar illumination light source device 1' in the present embodiment.

Eighth Embodiment

Figure 9:
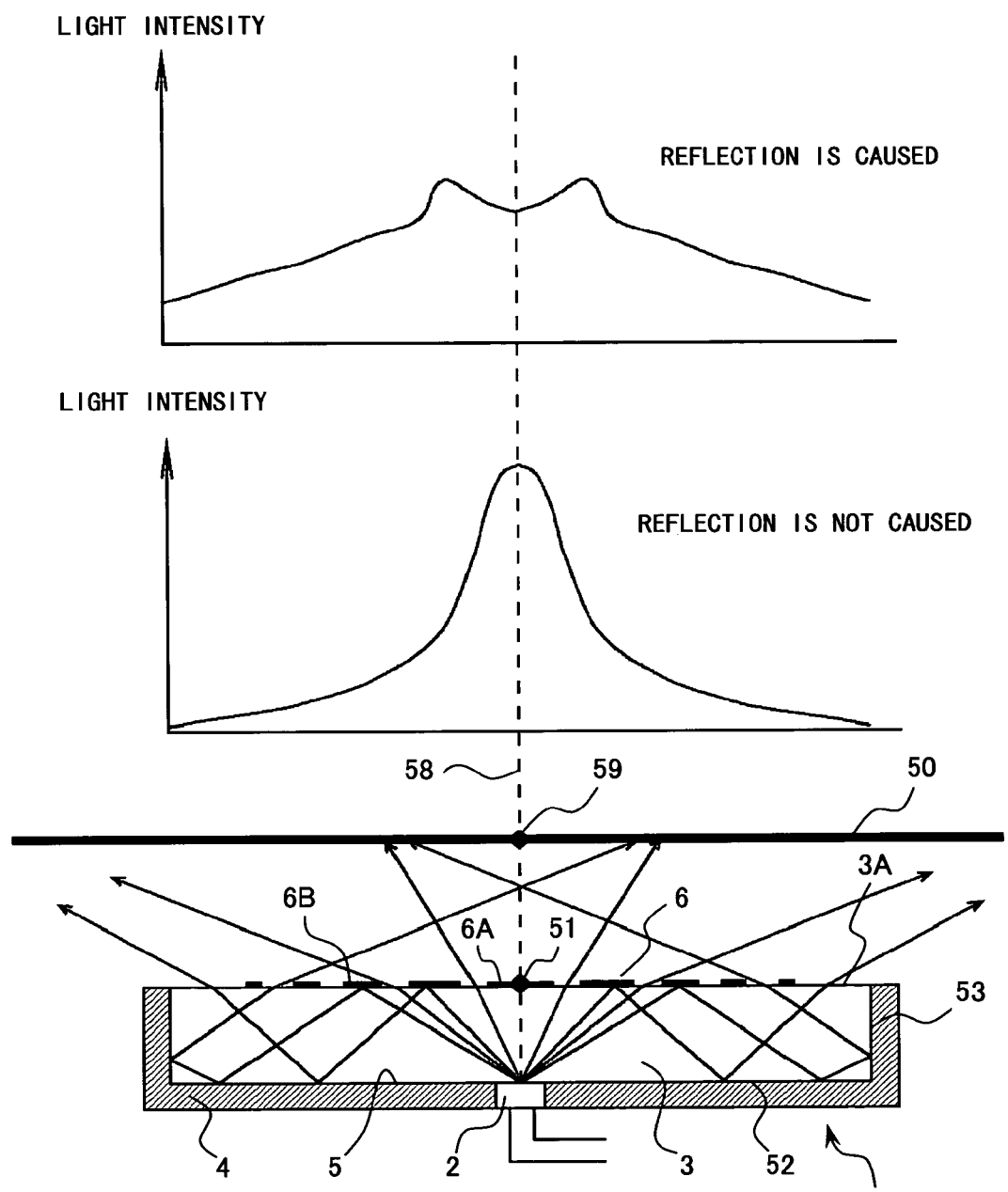
FIG. 9 is a longitudinal sectional view of a planar illumination light source device according to an eighth embodiment.

FIG. 9 is a longitudinal sectional view for showing the characteristics of the planar illumination light source device 1 according to the present embodiment.

As described in FIG. 1, light is emitted from the light source 2 such as an LED or the like. The light illuminates a plane 50. When viewed from the plane 50, the size of the light source 2 is sufficiently small, and accordingly the light source 2 can be regarded as a point-light source. The plane 50 is arranged a prescribed length away from the light source 2. The planar illumination light source device 1 has a function of illuminating the entirety of the plane 50 as uniformly as possible. The length between the planar illumination light source device 1 and the plane 50 can be set arbitrarily.

For example, there is a case in which an image to be illuminated is drawn at a position of the plane 50. Also, there is a case in which a reflection plate is arranged for indirect illumination at the position of the plane 50. Further, at the plane 50, there may be a hood that is a semi-transmissive panel for illuminating the opposite side of the planar illumination light source device 1. An appropriate length is set in accordance with the needs of particular cases. In any case, it is desirable that light be emitted with a uniform intensity to cover as wide an area as possible.

The upper view shows the received light intensity distribution on the plane 50 when the plane 50 directly receives the light emitted from the light source 2. The middle view shows the distribution when the central reflection part 6A or the outward reflection part 6B are not present. The upper view shows the distribution when the central reflection part 6A and the outward reflection part 6B are present. In both of these views, the vertical axes represent the received light intensities and the horizontal axes represent the positions on the plane.

In the middle graph, the reception light intensity has the peak value at the reference point 59 that is closest to the light source 2, and the reception light intensity decreases as the distance from the reference point 59 becomes longer. If the light source 2 having directionality due to the use of LEDs is used when the above light guiding body 3 is not present, this state is caused.

The above light guiding body 3 has a radiation plane 3A that is substantially parallel to the plane 50 and a back plane 52 that is substantially parallel to the radiation plane 3A. Further, it has a side plane 53 arranged along the periphery so that the side plane 53 encloses the radiation plane 3A and the back plane 52. The light guiding body 3 is provided in the space enclosed by the radiation plane 3A, the back plane 52, and the side plane 53. The light guiding body 3 is made of optically transmissive material such as glass, plastic or the like. It may be gas or liquid.

The central reflection part 6A and the outward reflection part 6B are radiation side reflection means. The radiation side reflection means is arranged on the radiation plane 3A, and has a function of reflecting, in the direction of the back plane 52 or the side plane 53, the light traveling in the light guiding body 3. The light guiding body 3 is made of a quadrate of, for example, 10 cm×10 cm. In order to emit light from the radiation plane 3A efficiently, it is desirable that a reflection plane also be formed on the side plane 53.

The inside reflection part 5 is provided on the back plane 52, and reflects, in the direction of the radiation plane 3A or the side plane 53, the light traveling in the light guiding body 3. In this configuration, a cross point between a reference line 58 drawn between the light source 2 and the reference point 59 on the plane 50 and the radiation plane 3A is referred to as a particular point 51. It is desired that the central reflection part 6A include the particular point 51 and be a reflection body that is a circle or a regular polygon whose center is the particular point 51 because when direct light from the light source 2 is emitted to the plane 50, the peak of the light intensity becomes sharp. Accordingly, the configuration shown in FIGS. 3A and 3B is the most desirable for lowering the brightness at the reference point 59. Also, when the brightness at the part of the reference point 59 does not matter, the above other embodiments can be employed.

Also, it is desirable that the outward reflection part 6B enclose the central reflection part 6A and is made of a reflection body having slits parallel to the arc or the bases. The slits can be continuous or not continuous. In the embodiment shown in FIGS. 3 and 4, a large number of continuously looped slits are arranged. When, for example, the reflection body is arranged in the open air, there is a risk of deterioration of the outward reflection part 6B due to the ultraviolet rays and sunlight. By using slots for the portions from which light is emitted, the stiffness of the outward reflection part 63 increases so that falling and deformation can be avoided.

Also, the slit may be an opening on the reflection part or can be a transmissive body. Anything can be the slit as long as it is a slit that transmits light. In the descriptions below, explanations are given in which the word "slit" refers to any portion that is a slit that transmits light.

In the present embodiment, by providing the outward reflection part 6B and the central reflection part 6A, as shown in the upper view of FIG. 9, the light intensity around the reference point 59 on the plane 50 is lowered, and generally uniform light is radiated over the peripheral portion.

Ninth Embodiment

Figure 10:
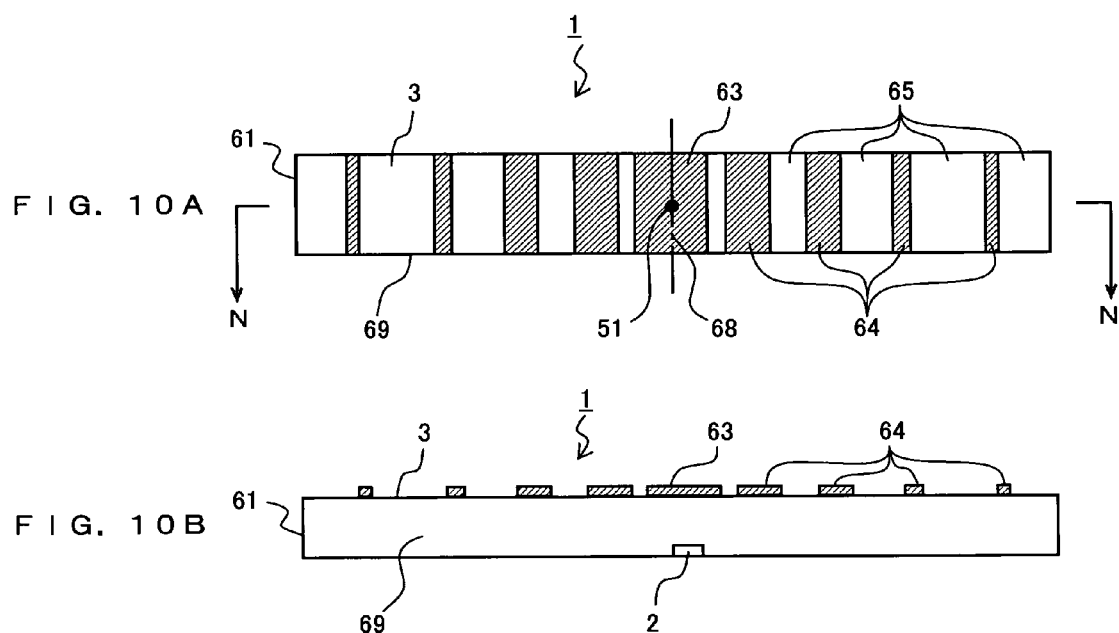
FIG. 10A is a plan view of a belt shaped planar illumination light source device according to a ninth embodiment.
FIG. 10B is a longitudinal sectional view of the above configuration.

FIGS. 10A and 10B show an embodiment of the planar illumination light source device 1. FIG. 10A is a plan view thereof, and FIG. 10B schematically shows a cross section along the line N-N thereof.

The planar illumination light source device 1 is bilaterally symmetrical about a straight line 68 that passes the particular point 51. Further, the light guiding body 3 that is belt shaped and long over the direction orthogonal to the straight line 68 is used. At the center, a reflection body 63 that is rectangular and bilaterally symmetrical about the straight line 68 is provided. This corresponds to the central reflection part. Also, reflection bodies 64 are provided so that they sandwich a reflection body 63. The reflection bodies 64 have slits 65 parallel to the straight line 68. The reflection bodies 64 correspond to the outward reflection parts in the above embodiments. In the example in the figure, the reflection bodies 64 are narrower as they are located farther from the straight line 68.

The slits 65 are wider as they are located farther from the straight line 68. Thereby, it is possible to emit uniform light. In this embodiment, the configuration of the reflection body is simple, and thus the production thereof is easy and cost effective. Also, it is possible to realize stiff light source devices that emit linear and uniform light in the longitudinal direction. Also, when a belt-shaped light guiding body is used, the reflection of light by a side plane 69 is very important. It is desirable that a reflection body that yields high reflectance be disposed on the side plane 69. Also, efficiency can be increased by providing a reflection plane of a high quality to the end face 61.

Tenth Embodiment

Figure 11:
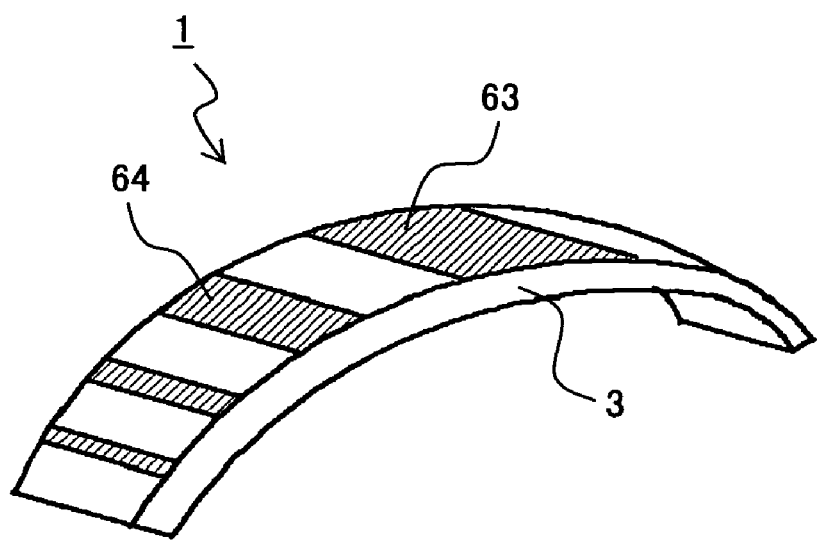
FIG. 11 schematically shows an object obtained by curving the belt shaped planar illumination light source device according to a tenth embodiment.

FIG. 11 shows another embodiment of the planar illumination light source device 1.

FIG. 11 is a perspective view of the belt shaped planar illumination light source device 1 in a curved state.

When the above described light guiding body 3 is made of a flexible plate such as a transmissive plastic plate, it can be curved arbitrarily as shown in FIG. 11. When the planar illumination light source device 1 in the other embodiments is made of the same flexible plate, it can be used while being curved along an arbitrary curved plane. Of course, a curved light guiding body can be produced by using hard materials cast into dies or the like.

Eleventh Embodiment

Figure 12:
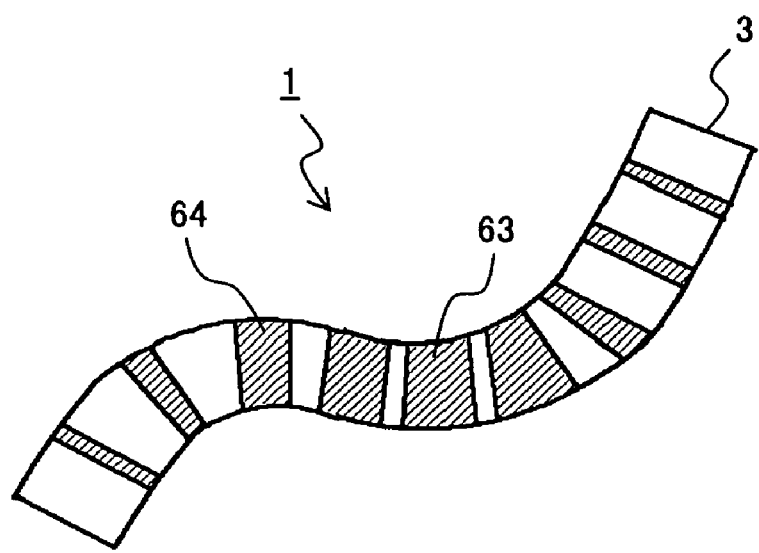
FIG. 12 schematically shows an object obtained by curving, into the shape of a letter S, the belt shaped planar illumination light source device according to the tenth embodiment.

FIG. 12 shows yet another embodiment of the planar illumination light source device 1.

In the present embodiment, the entirety of the planar illumination light source device 1 is on a flat plane and is curved to be in the shape of a letter S. The light guiding body 3 can be curved not only in the shape of a letter S, but also to any shape. Also, a light guiding body 3 of various shapes can be used. This can be used for various purposes such as neon lighting or the like.

Twelfth Embodiment

Figure 13A:
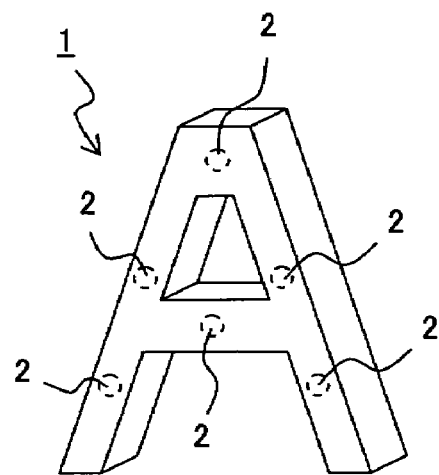
FIG. 13A is a perspective view of an object in which the belt shaped planar illumination light source device according to a twentieth embodiment is applied.
Figure 13B:
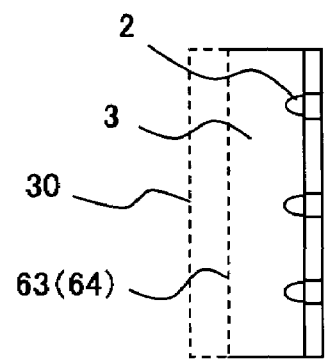
FIG. 13B is a cross-sectional side view of the above configuration.
Figure 13C:
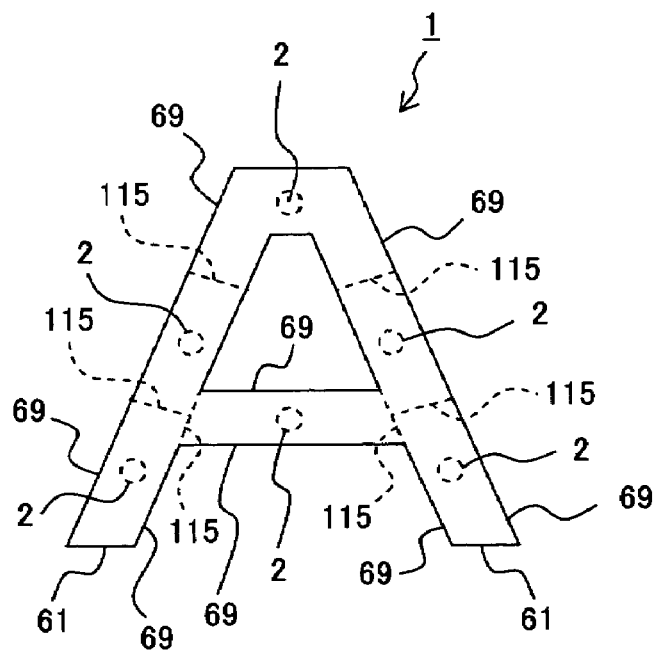
FIG. 13C is a front view of the above configuration.

FIGS. 13A and 13B show an embodiment in which a belt shaped planar illumination light source device 1 is used.

In this embodiment, the light guiding body 3 in the shape of a three-dimensional "A" is used to form the planar illumination light source device 1.

This planar illumination light source device 1 has six point-light sources 2, the light guiding body 3 in the form of an A, and a light diffusion plate 30. Also, on the radiation plane 3A of the light guiding body 3, the reflection bodies 63 and 64 shown in, for example, FIGS. 10A and 10B are provided. When this light guiding body 3 is used, the reflection of light on the side plane 69 is very important. It is desirable that a reflection body that yields a high reflectance be disposed on the side plane 69. Also, efficiency can be increased by providing a reflection plane of a high quality to the end face 61.

Also, it is possible to divide it into six blocks by disposing, between the adjacent point-light sources, partitions 115 serving as reflection plates. This is because it is possible to emit uniform light by causing a multipath reflection of light from the point-light sources by using the partitions 115, and the reflection bodies 63 and 64.

Also, in the present embodiment, the light guiding body 3 that is in the form of a three-dimensional "A" is used; however, the scope of the present invention is not limited to this, and it is possible to use various and other letters, figures, symbols, or the like that are three dimensional as the planar illumination light source device 1.

The present embodiment can be applied to various boards, automobile interior lamps, road signs, guideboards, and the like.

Thirteenth Embodiment

FIG. 14A is a plan view of an example of the planar illumination light source device 1 in a polygonal shape including a plurality of point-light sources 2.

In the present embodiment, the planar illumination light source device 1 can be formed of various polygonal shapes.

When a right triangle, a quadrate, a hexagon, etc. are combined, it can be used as a light source device that covers the entirety of a wall of a building or the like.

The solid line 72 on a wall 71 shown in FIG. 14A is the boundary of a single planar illumination light source device 1. In this case, the point-light sources 2 are respectively provided at the center points of the regular hexagons. The solid lines 72 are the partition as the reflection plate. This partition is provided to obtain more uniform illumination light. However, it is possible to obtain uniform light even without this partition.

FIG. 14B is a plan view showing another embodiment of a planar illumination light source device 73 having a polygonal shape and including the point-light sources 2.

As shown in FIG. 14B, the planar illumination light source device 73 may be made by combining, for example, six regular triangles by using the above partitions as reflection plates. In this case, the point-light sources 2 are respectively arranged at the center points on the regular triangles. Also, in the present embodiment, the radiation side reflection parts 6 are formed while corresponding to the six regular triangles. By this radiation side reflection part 6, straight and non-continuous slits 74 are formed. Thereby, as explained, the stiffness is high because of the honeycomb configuration, and their production is also easy.

FIGS. 14C and 14D are plan views showing the cross sections of the planar illumination light source device 1 in still another embodiment. FIG. 14C shows the state in which the radiation side reflection part 6 is removed from FIG. 14D.

These planar illumination light source devices 1 are divided into a plurality of pieces by regular triangular partitions 72 serving as reflection plates. Also, the point-light sources 2 are provided respectively at the center points of the regular triangular partitions 72. Also, as shown in FIG. 14D, the radiation side reflection part 6 having a prescribed pattern is provided for each part defined by the regular triangular partitions 72.

Fourteenth Embodiment

FIG. 15 is a plan view showing a film 80 having slits 81.

In the present embodiment, the film 80 is pasted onto the radiation plane 3A of the light guiding body 3 shown in, for example, FIG. 1. This film 80 is made of plastic such as polyethylene, polycarbonate, or the like, and can be pasted onto the radiation plane 3A by using heat or adhesive. The film 80 has a lot of slits 81. The back plane is a reflection film such as an aluminum laminate film. This is for the multipath reflection described above. These slits 81 are provided on the arcs of the concentric circles enclosing the particular point 51 (see FIG. 9) at the center of the radiation plane 3A. Also, these slits 81 may be linear and parallel to the bases of arbitrary polygons enclosing the particular point 51.

Additionally, when many of the slits 81 provided on the film 80 are wide, wrinkles are made on the film 80 so that careful handling of the film is required. In order to avoid this, the portions at which the slits 81 are to be formed are made of transmissive or semi-transmissive film 80, and the other portions are made of reflective film. Thereby, the strength of the film 80 increases. Also, the handling of the film 80 becomes easier, and the production rate also rises. Additionally, as described above, the reflection body does not have to reflect all the incident light. The reflectance is set to be a prescribed value by an absorption body that absorbs a part of the incident light or an irregular reflection body.

These are distributed appropriately over the radiation plane 3A. Also, there is a film that reflects a part of the light and transmits the remaining part of the light. A configuration can be employed in which a plurality of films of this type are stacked in groups near the particular point 51 and the number of the stacked film is reduced as the distance from the particular point 51 becomes longer. In other words, the configuration can be a stacked body of reflection films.

Fifteenth Embodiment

FIGS. 16A through 16D are schematic views showing a planar illumination light source device 90 having a plurality of light sources 91.

Figure 16A:
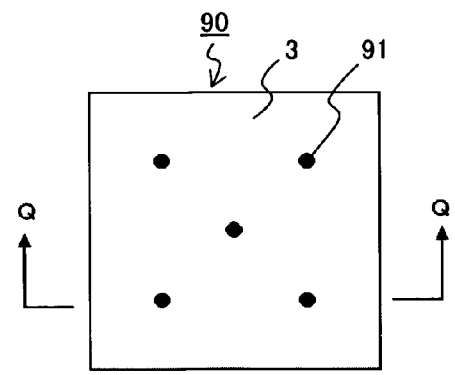
FIG. 16A is a cross-sectional plan view of a planar illumination light source device having a plurality of light sources.
Figure 16B:
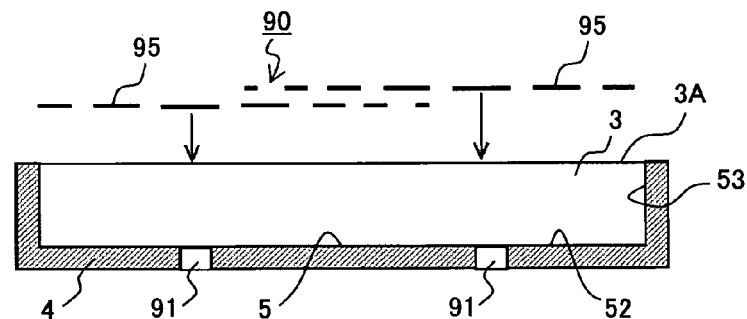
FIG. 16B is a cross-sectional view of the line Q-Q of the above configuration.
Figure 16C:
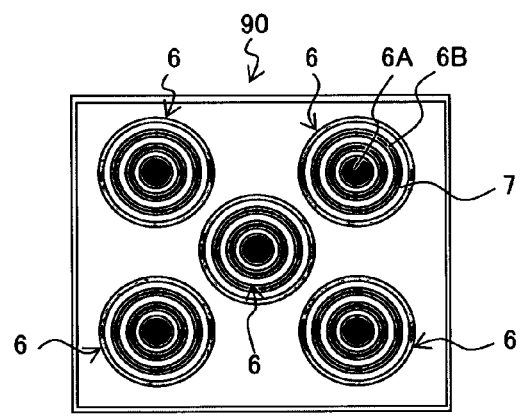
FIG. 16C is a plan view of the above configuration.

FIG. 16A is a plan view showing the light guiding body 3. In this view, the outward reflection part 6B and the central reflection part 6A that will be explained in FIG. 16C are omitted.

The inside reflection parts 5 are provided on the back plane 52 and the side plane 53, and have reflection planes for reflecting, in the direction of the radiation plane 3A or the side plane 53, the light traveling in the light guiding body 3. Thereby, the light emitted from the light sources 91 is reflected in the manner of the multipath reflection without being absorbed by these reflection planes. Thereby, all the light emitted from the light sources 91 is utilized so that uniform illumination light can be obtained.

As shown in the figure, the planar illumination light source device 90 has five point-light sources 91. FIG. 16B shows a cross section along the line Q-Q. In the present embodiment, five light sources 91 are provided on the portion corresponding to the back plane of the light guiding body 3 in such a manner that they are point symmetrical. The number of light sources 91 is not limited to five, and the arrangement thereof may be, for example, a matrix arrangement of a set of the light sources 91.

Also, as will be shown in FIG. 19C, the planar illumination light source device 90 can have the side plane 53 that extends upward.

In that configuration, the outward reflection part 6B and the central reflection part 6A are used in such a manner that patterns 95 designed for one point-light source are stacked as indicated by the arrow. In this case, when the originals are stacked as they are, the amount of light emitted to the outside is reduced. Accordingly, the widths of the slits are made wider and a light source of uniform brightness is realized.

FIG. 16C is a plan view showing the planar illumination light source device 90. In this embodiment, the circular reflection bodies 6A provided on the radiation plane 3A and a plurality of looped outward reflection parts 6B provided concentrically about the central reflection parts 6A at a prescribed interval are included. Thereby, the outward light transmissive parts 7 are made at a prescribed interval. Also, the radiation side reflection part 6 is circular in this explanation; however, it can belt-shaped.

Figure 16D:
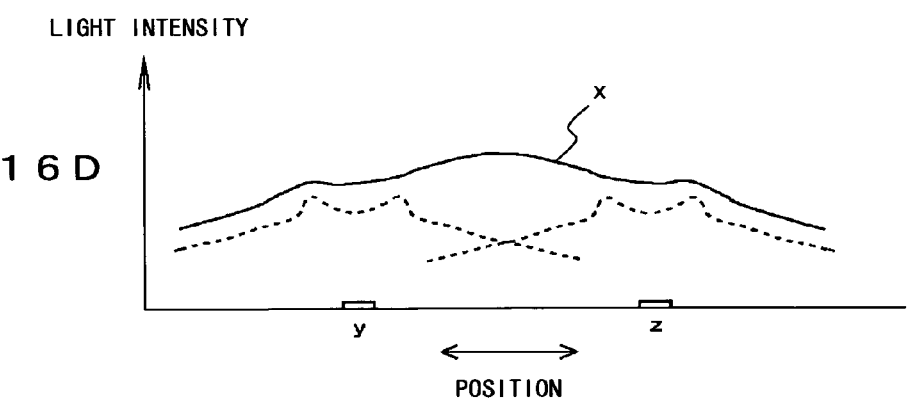
FIG. 16D shows the light intensity on the line Q-Q of the above configuration.

FIG. 16D is a graph drawn in the same manner as that shown as the upper view of FIG. 9, and represents light intensities on the line Q-Q in FIG. 16A. The points y and z on the horizontal axis represent the positions of the light source 91.

According to the present embodiment, beams from a plurality of the point-light sources 91 are synthesized, and thereby a very flat characteristic X was obtained over a wide area.

Sixteenth Embodiment

Figure 17A:
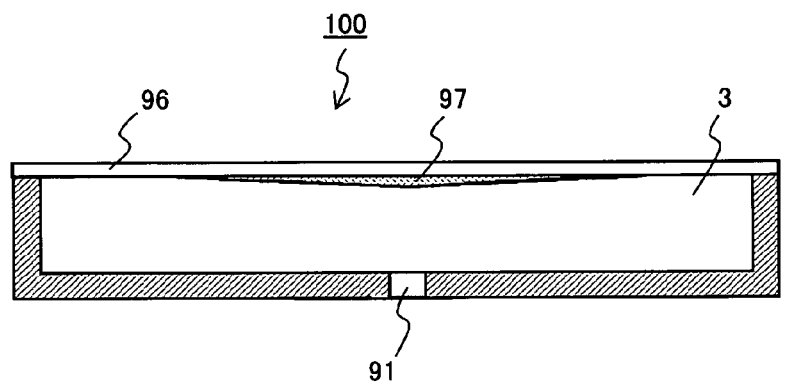
FIG. 17A is a longitudinal sectional view of a polygonal planar illumination light source device according to the fourteenth embodiment.
Figure 17B:
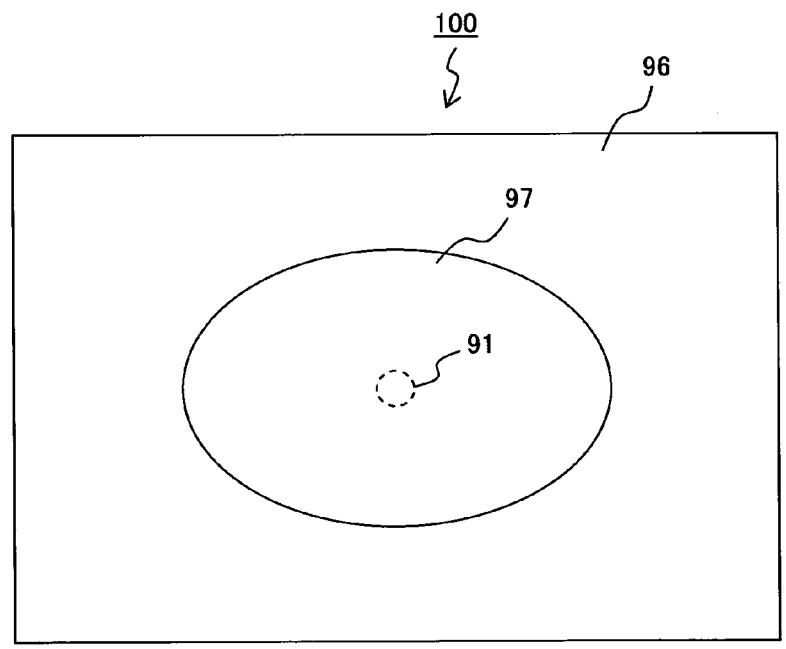
FIG. 17B is a plan view of the polygonal planar illumination light source device according to the fourteenth embodiment.

FIG. 17A is a longitudinal sectional view of the planar illumination light source device 90 according to the present embodiment. FIG. 17B is a plan view thereof.

In the present embodiment, the light guiding body 3 of the planar illumination light source device 90 is dry air. A glass plate 96 is arranged so that it entirely covers the radiation plane of the upper plane of the light guiding body 3. This is a plate-shaped transmissive body. The point-light source 91 is arranged on the central bottom plane of the light guiding body 3. A reflection film 97 is formed on the plane opposite to the light source 91 on the glass plate 96 by evaporating silver or the like. The thickness of the reflection film 97 is the greatest at the portion corresponding to the above particular point closest to the light source 91, and becomes smaller as the distance from the particular point becomes greater.

Also, as shown in FIG. 17B, the reflection film 97 is ellipsoidal because the glass plate 96 is not circular and is not at the same length from the light source 91. By making the reflection film 97 rectangular or ellipsoidal in accordance with the glass plate 96, it is possible to uniformize light. When the reflection film 97 is ellipsoidal, the light is superposed in the direction of the shorter bases so that the density increases, and, in the direction of longer base, the density becomes lower when, for example, a plurality of the planar illumination light source devices 100 are arranged; thus there is a risk that the light will not be uniform in the longitudinal direction.

Also, when the reflection film 97 is formed of a very thin evaporated film, it reflects fifty percent of the light at thin portions and reflects ninety percent of the light at thick portions. The rest of the light is transmitted through the reflection film 97. This type of a film can be formed easily by melting and evaporating evaporation metal with the evaporation metal being opposed to a glass plate in an evaporation device. It is possible to arbitrarily adjust the degree of the thickness of the film and the thickness balance by changing the positions and the processing period of supporting the glass plate 96 during the evaporation process.

According to the present embodiment, compared to the case in which slits or the like are provided, production cost can be reduced because only the evaporation process is needed in existing equipment. By using different types of metal to be evaporated, the transmittance can be adjusted too. At different parts of the reflection film 97, light is transmitted, reflected in a prescribed direction, or scattered. A portion of the light is absorbed; however, metal evaporation film reflects a lot of light, and operates so that uniform light is reflected to the outside. In the example of this figure, the reflection film 97 faces the side of the light source 91 in order to protect the reflection film 97; however, the reflection film 97 may face toward the outside. The effect is almost the same. If what is evaporated is not a glass plate but a film or the like, the production efficiency will increase.

Seventeenth Embodiment

Figure 18:
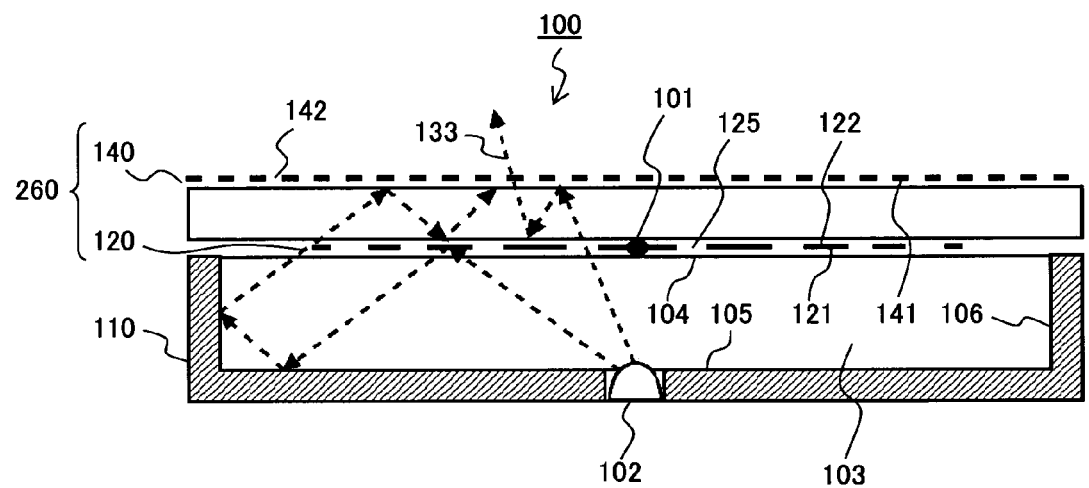
FIG. 18 is a longitudinal plan view of a planar illumination light source device according to a seventeenth embodiment.

FIG. 18 is a longitudinal sectional view showing the planar illumination light source device 100 according to the present embodiment.

This planar illumination light source device 100 includes a point-light source 102, a light guiding body 103, inside reflection means 110, and radiation side reflection means 260. This radiation side reflection means 260 has first radiation side reflection means 120 and second radiation side reflection means 140. The configurations of the point-light source 102 and the light guiding body 103 are the same as those in the above embodiments. The light guiding body 103 has a radiation plane 104, a back plane 105, and a side plane 106. The first radiation side reflection means 120 is arranged on the radiation plane 104. This configuration may be the same as those in the above embodiments.

In other words, the inside reflection means 110 has reflection planes that are provided on the back plane 105 and the side plane 106 for reflecting the light traveling in the light guiding body 103 in the direction of the radiation plane 104 or the side plane 106. Thereby, the light emitted from the point-light source 102 is reflected in the manner of the multipath reflection without being absorbed in these reflection planes. Thereby, all the light emitted from the point-light source 102 is utilized, and uniform illumination light can be obtained. As described above, in order to cause the radiation plane 104 to reflect light efficiently, it is desirable that the back plane 105 and the side plane 106 have excellent reflection planes.

Further, as shown in FIG. 19C (this will be explained later), the side plane 106 can extend upward.

The first radiation side reflection means 120 has an opening group 125 over a particular point 101. Also, the second radiation side reflection means 140 is provided in order to increase the efficiency of the uniformization of the amount of light by the multipath reflection, and accordingly the distribution of the group of openings 125 may be uniform except for the ones distributed around the particular point 101. On the first radiation side reflection means 120, the back side of a first reflection plane 121 has a second reflection plane 122. The second reflection plane 122 reflects the light that has traveled through the opening group 125.

This first radiation side reflection means 120 can cause the same effect by using any of the respective patterns shown in FIGS. 32A through 32D (will be explained later). FIG. 18 shows the cross section of the pattern shown in FIG. 32A. Then, above the first radiation side reflection means 120, the second radiation side reflection means 140 having a microhole group 142 arranged uniformly thereon is set.

The second radiation side reflection means 140 is arranged on the side of the second reflection plane 122 of the first radiation side reflection means 120. The second radiation side reflection means 140 is a diffusion plate, and is arranged so that it faces the first radiation side reflection means 120 with a prescribed interval. It has a third reflection plane 141 for reflecting the light that is radiated after traveling through the opening group 125 of the first radiation side reflection means 120 in the direction of the second reflection plane 122. On the second radiation side reflection means 140, the microhole group 142 is formed so that the density is substantially uniform over its entirety.

In this embodiment, the radiation side reflection means is configured to be in a two-layer configuration. Light 131 reflected in the multipath reflection manner in the light guiding body 103 is emitted from the openings on the first radiation side reflection means 120. Further, the light is reflected in a manner of the multipath reflection in the space between the first radiation side reflection means 120 and the second radiation side reflection means 140. The density distribution of the microhole group 142 on the second radiation side reflection means 140 is uniform. The light 133 that is uniform over the entirety is emitted from the microhole group 142 due to complex multipath reflection. Thereby, it is possible to level the inequalities of the light intensity due to the distribution of the openings on the first radiation side reflection means 120.

Also, according to the present embodiment, the second radiation side reflection means 140 is arranged in such a manner that the patterns of the openings and the like on the first radiation side reflection means 120 cannot be seen when the planar illumination light source device 100 is viewed from above, and accordingly the thickness of the planar illumination light source device 100 in the radiation direction can be small.

For example, in an experiment, when the first radiation side reflection means 120 was not provided, the thickness of the planar illumination light source device 100 had to be at least 100 mm in order to obtain uniform illumination light. However, when the first radiation side reflection means 120 was provided, the thickness could be reduced to be about 30 mm. In this case, the interval between the first radiation side reflection means 120 and the second radiation side reflection means 140 was about 20 mm. Then, it was found that providing this interval is one of the important conditions to be satisfied for obtaining uniform illumination light.

The second radiation side reflection means 140 can be a multi-layer film coating layer that does not absorb much light, and the reflectance is desirably 50% through 90%, and the transmissivity is 50% through 1%. Also, as the second radiation side reflection means 140, a single-layer film coating layer may be used; however, it is desirable that a multi-layer film coating layer be used. Also, the second radiation side reflection means 140 may be a diffusion plate.

FIGS. 19A through 19C explain main factors of the planar illumination light source device 100.

FIG. 19A is a plan view showing the second radiation side reflection means 140. As shown in FIG. 19A, the microhole group 142 is arranged at the same density over the entire plane of the second radiation side reflection means 140. Additionally, the diameter of each microhole is equal to or greater than 10 μm but no more than 100 μm. When the diameter of the microhole is smaller than 10 μm, the amount of the transmitted light is not sufficient, and the energy efficiency is reduced. When the diameter of the microhole is greater than 100 μm, light is transmitted to the outside via the microholes without being sufficiently reflected in a manner of the multipath reflection. Accordingly, it is desirable that the diameter of each microhole be equal to or greater than 10 μm but no more than 100 μm.

Also, the total opening area of the microhole group 142 is equal to or greater than 10% but no more than 60% of the total area of the second radiation side reflection means 140. If the total area of the openings of the microhole group 142 is less than 10% of the total area of the second radiation side reflection means 140, the amount of transmitted light 133 is not enough, and the energy efficiency is lowered. When the total area of the openings of the microhole group 142 is greater than 60% of the total area of the second radiation side reflection means 140, light is transmitted to the outside via the microholes without being reflected in a manner of the multipath reflection sufficiently. Accordingly, it is desirable that the total area of the openings of the microhole group 142 be equal to or smaller than 60% of the total area of the second radiation side reflection means 140.

FIG. 19B is a longitudinal cross-sectional view of the inside reflection means 110. According to an experiment, as shown in FIG. 19B, in order to cause multipath reflection, a reflection caused not only by the back plane 105 but also by the side plane 106 is very effective. Without the side plane 106, the amount of the emitted light is greatly reduced at places far from the point-light source 102. Also, the configuration according to the present embodiment makes the uniformization of the emitted light amount easier to achieve than the configuration in which a plurality of the point-light sources 102 are arranged on the back plane 105.

Also, the side plane 106 is not necessarily perpendicular to the back plane 105. FIG. 19C is a longitudinal cross-sectional view showing a variation of the inside reflection means 110. The side plane 106 may extend upward.

Eighteenth Embodiment

FIGS. 20A and 20B show another embodiment of the planar illumination light source device 100.

In this embodiment, the planar illumination light source device 100 has at least one point-light source (six point-light sources in this embodiment) arranged, in a matrix arrangement, on the portion corresponding to the back plane of the light guiding body 103. Also, the number of point-light sources can be set arbitrarily. The other configurations are the same as those explained in the seventeenth embodiment.

In other words, the inside reflection means 110 has reflection planes that are provided on the back plane 105 and the side plane 106 for reflecting the light traveling in the light guiding body 103 in the direction of the radiation plane 104 or the side plane 106. Thereby, the light emitted from the point-light source 102 is reflected in the manner of the multipath reflection without being absorbed in these reflection planes. Thereby, all the light emitted from the point-light source 102 is utilized, and uniform illumination light can be obtained.

Also, in the present embodiment, partitions for dividing adjacent point-light sources 102 are not provided. Further, as shown in FIG. 19C, the side plane 106 may extend upward.

This is because the light emitted from the respective point-light sources 102 is repeatedly reflected by the reflection plane formed on the back plane 105 of the inside reflection means 110 and the side plane 106, the first radiation side reflection means 120, and the second radiation side reflection means 140, and the light amount can be uniformized by the multipath reflection. However, as a matter of course, in order to obtain more uniform illumination light, it is more desirable that the above partitions be provided.

Also, a portion around the center can be curved when the outer shape of the planar illumination light source device 100 is large. In order to avoid this, a transmissive plate, a reflection plate, or the like can be attached to the portion around the center.

Nineteenth Embodiment

FIG. 21 is a longitudinal cross-sectional view showing the planar illumination light source device 100 obtained by combining the embodiments shown in FIGS. 18 and 19.

In FIG. 21, a reflection body 150 is provided so that the space between the first radiation side reflection means 120 and the second radiation side reflection means 140 is enclosed. This reflection body 150 has the same function as that of the inside reflection means 110. The space between the first radiation side reflection means 120 and the second radiation side reflection means 140 can be formed by, for example, a transmissive acrylic plate. As a matter of course, it can be an air layer. The second radiation side reflection means 140 may be a plastic film that has undergone a hole-making process.

Also, it can be a multi-layer film coating that does not absorb much light, and it is desirable that this multi-layer film coating have a reflectance of 50% through 99%. Further, a diffusion plate can be used in place of this multi-layer film coating.

FIG. 22A is a schematic longitudinal cross sectional view showing the planar illumination light source device 100 in which the shapes of the reflection body and the radiation side reflection means are changed. FIG. 22B is a perspective view thereof. FIGS. 22C through 22E are exploded perspective views thereof.

In this embodiment, the first radiation side reflection means 120, the second radiation side reflection means 140, and a reflection body 165 behind the light guiding body 103 are polyhedrons that are axis symmetric with respect to a reference line 168 that passed through the point-light source 102. On the first radiation side reflection means 120, a prescribed pattern shown in FIG. 32A (this will be explained later) is formed. Also, on the second radiation side reflection means 140, the micro-hole group 142 is arranged over its entirety, or the plane thereof is formed of ground glass. Further, the reflection body 165 has the shape of a parabola antenna whose top plane is open in such a manner that the higher it is the greater the diameter thereof.

Also, it is possible to employ a configuration in which only the reflection body 165 is in the shape shown in the figure, and the first radiation side reflection means 120 and the second radiation side reflection means 140 are flat plates. Also, it is possible to employ a configuration in which only one of the first radiation side reflection means 120 and the second radiation side reflection means 140 is in this shape. Further, the shape of the reflection body 165 may be that of a portion of a spherical plane instead of a polyhedron.

The reflection body 165 behind the light guiding body 103 has the same effect as that of a parabola antenna, and converts light of the point-light source 102 into a beam of a prescribed width. In other words, in FIG. 21A, the light emitted from the reflection body 165 is radiated so that it spreads outward with respect to the normal. Also, the first radiation side reflection means 120 and the second radiation side reflection means 140 convert light of the point-light source 102 into a beam of a prescribed width on the basis of the lens effect. Accordingly, it is appropriately used as a light source for emitting a light beam of a prescribed width.

Twentieth Embodiment

Figure 23:
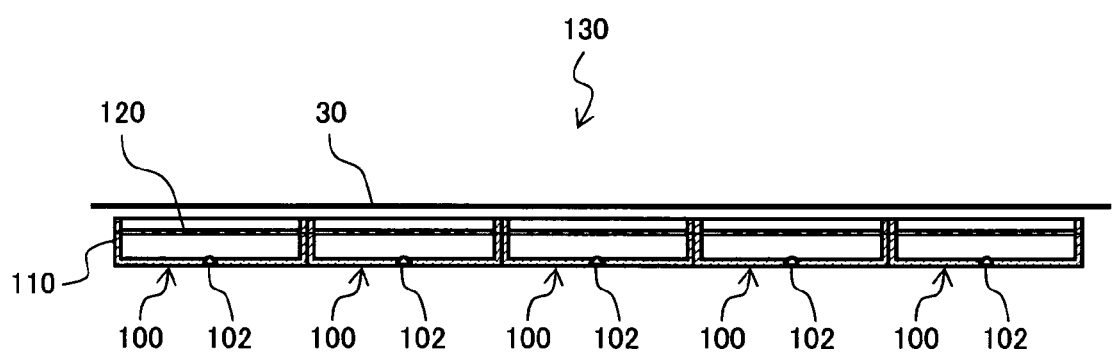
FIG. 23 is a longitudinal sectional view of a planar illumination light source device according to a twentieth embodiment.

FIG. 23 is a longitudinal cross-sectional view showing a planar illumination light device 130 according to the present embodiment.

In FIG. 23, the planar illumination light device 130 employs a configuration in which a lot of the planar illumination light source devices 100 shown in FIG. 21 are used as unit modules and are arranged on a plane (in the figure, five planar illumination light source devices 100 are arranged in the horizontal direction) in a matrix arrangement. In other words, each planar illumination light source device 100 has the point-light source 102 in the casing of the inside reflection means 110 and has the first radiation side reflection means 120. Also, the planar illumination light device 130 has a large diffusion plate 30 arranged in such a manner that it covers the upper portions of a plurality of the planar illumination light source devices 100. This light diffusion plate 30 corresponds to the second radiation side reflection means 140.

According to an experiment, the practical size of one LED is 10 cm×10 cm (height by width), and by employing this configuration, a planar light source that is flat and uniform over several square meters can be obtained.

Figure 24:
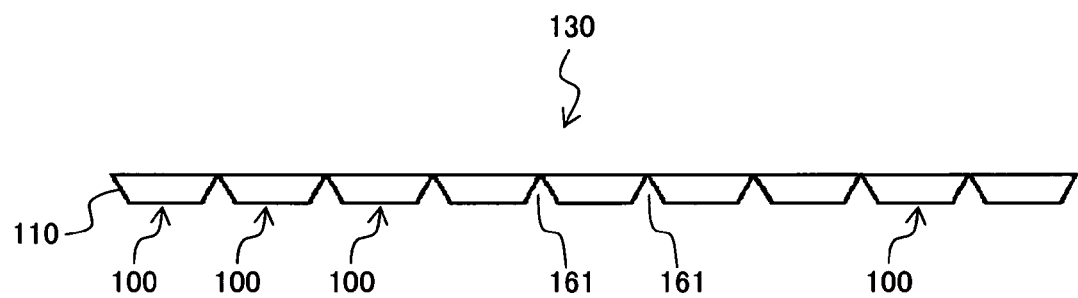
FIG. 24 is an array of things having the configuration shown in FIG. 19C.

FIG. 24 is a front view showing the planar illumination device 130 obtained by arranging a set of modules 160 having the plurality of inside reflection means 110 shown in FIG. 19C in the matrix arrangement.

In this planar illumination light device 130, the first radiation side reflection means 120 and the second radiation side reflection means 140 are not shown.

In this figure, each module 160 has the inside reflection means 110, and extra spaces 161 are formed between the adjacent inside reflection means 110. Accordingly, these extra spaces 161 can be used as spaces for, e.g., structural materials, electric wiring, or the like.

FIGS. 25A through 25D are plane views of the planar illumination light device 130 formed by arranging a set of the planar illumination light source devices 100 in the matrix arrangement.

In other words, in this planar illumination light device 130, the first radiation side reflection means 120 and the second radiation side reflection means 140 are also not shown.

In FIGS. 25A and 25B, one point-light source 102 is provided for each of the planar illumination light source devices 100 that are defined by a matrix partition 12. In this configuration a part corresponding to partitions 162 functions very advantageously. Also, it was proven that arranging a set of the planar illumination light source devices 100 is very advantageous in view of the uniformity of the emitted light in comparison with a thing in which a plurality of point-light sources are arranged in a large light guiding body.

The configuration of the partition 162 may be of grating, as shown in FIGS. 25A and 25B, and may be of coils. In the case of the coil partition 162, one partition 162 is provided for each one of the planar illumination light source devices 100 arranged in the matrix arrangement.

The grating-like or coil-like partitions 162 may be provided between the first radiation side reflection means 120 and the second radiation side reflection means 140 shown in FIG. 23. Also, a larger partition 162 may be used so that one partition 162 can be arranged between the first radiation side reflection means 120 and the second radiation side reflection means 140.

Generally, "an LED board using light guiding plates" that is formed of a large and seamless uniformized light plate is very difficult to produce because it is made by connecting units horizontally. This is because the position of the LED and the light guiding plate position overlap each other, and spaces have to be provided between the adjacent light guiding plates. However, in the present embodiment, LEDs are arranged on the illuminating plane, and accordingly it is possible to obtain a seamless and large uniformized illumination board.

According to the present embodiment, this configuration produces excellent light mixing and performance of emitting light in the forward direction.

Twenty First Embodiment

Figure 26:
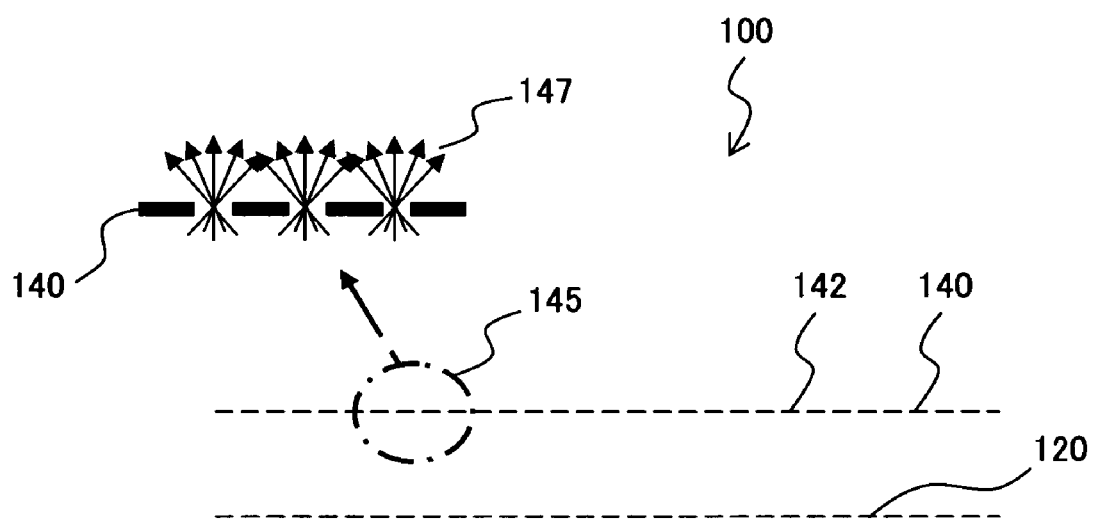
FIG. 26 shows operations of the second radiation side reflection means.

FIG. 26 explains an operation of the second radiation side reflection means 140.

As shown in FIG. 26, the planar illumination light source device 100 has the first radiation side reflection means 120 and the second radiation side reflection means 140 arranged to face the first radiation side reflection means 120 at a prescribed interval. The second radiation side reflection means 140 includes the microhole group 142. The light emitted from the first radiation side reflection means 120 is repeatedly reflected between the first radiation side reflection means 120 and the second radiation side reflection means 140, and is uniformly diffused. Also, a part of the light 147 is uniformly emitted through the microhole group 142 on the second radiation side reflection means 140 as represented by the arrows. In other words, as shown in the circle 145 depicted using an alternating long- and short-dashed line, light that has been repeatedly reflected in a manner of the multipath reflection is radiated over a wide angle with a uniform intensity. Accordingly, wide and uniform light beams that are wide angled can be obtained.

FIGS. 27A and 27B show the operations of a variation example of the second radiation side reflection means 140.

Also in this variation example, as shown in FIG. 27A, the second radiation side reflection means 140 has the micro-hole group 142. Also, the respective holes of this micro-hole group 142 have mirror surfaces so that light that has entered the hole is reflected many times in the hole, as shown in FIG. 27B.

FIG. 28 shows the operations of another variation example of the second radiation side reflection means 140.

In this example, the second radiation side reflection means 140 is formed of a multi-layered half mirror. This multi-layered half mirror is formed over the entirety of the reflection plane. A part of the light that has been transmitted through the first-layer half mirror is reflected by the back plane of the second-layer half mirror, and the rest of the light that has been transmitted through the first-layer half mirror is transmitted through the second-layer half mirror, and reaches the third-layered half mirror.

A very thin metal evaporation film or the like is also appropriate. The evaporation layers may be in multiple configurations. Application films may be formed in multiple configurations. As indicated by a circle 175 depicted by an alternating long- and short-dashed line, light is reflected in many ways because of the differences of the indexes of refraction at the boundary of the multi-layer films. Accordingly, the light 173 is reflected in a manner of the multipath reflection between the respective layers of the half mirrors, and a part is transmitted through the top layer and is emitted to the outside. Accordingly, by this variation example, the same effect is attained as is attained by the second radiation side reflection means 140 having the micro-hole group 142.

Figure 29:
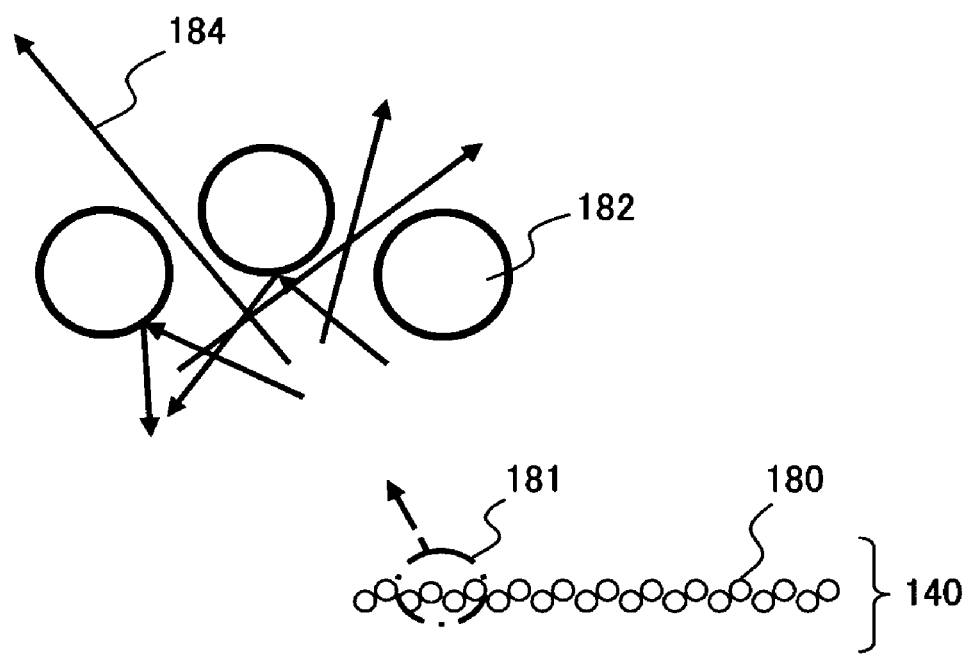
FIG. 29 shows operations of another variation example of the second radiation side reflection means.
Figure 32A:
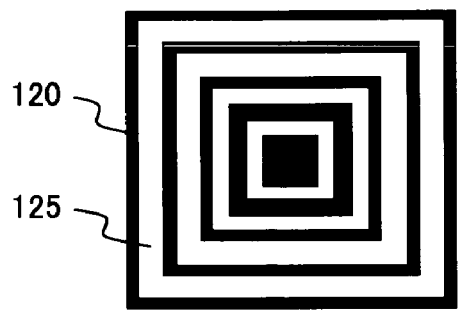
FIG. 32A shows an opening pattern of a first radiation side reflection means in a practical form.
Figure 32B:
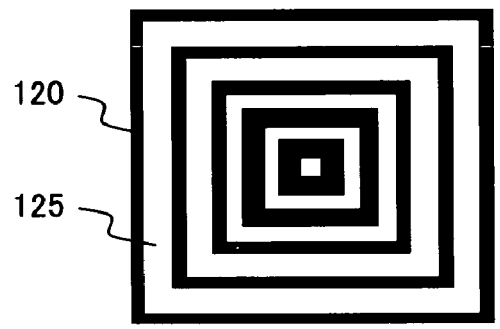
FIG. 32B shows an opening pattern of the first radiation side reflection means in a practical form.
Figure 32C:
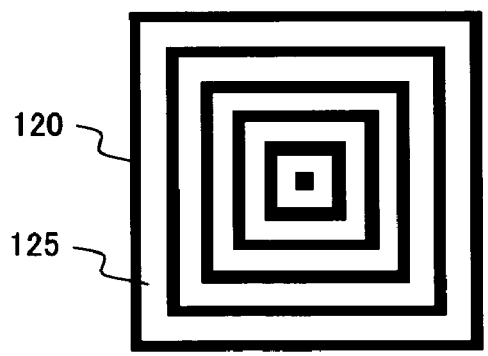
FIG. 32C shows an opening pattern of the first radiation side reflection means in a practical form.
Figure 32D:
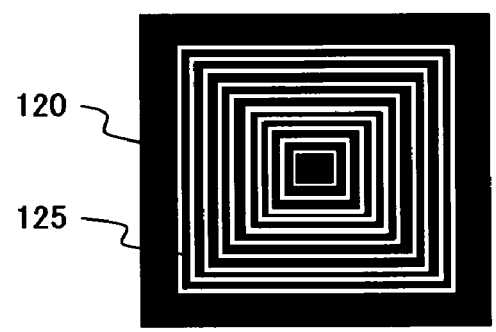
FIG. 32D shows an opening pattern of the first radiation side reflection means in a practical form.

FIG. 29 shows the operations of still another variation example of the second radiation side reflection means 140.

In this variation example, the second radiation side reflection means 140 has light reflection particle bodies 182 distributed over the entirety of the reflection plane at a substantially uniform density. These light reflection particle bodies 182 are formed in a plate shape to be covered by transmissive resin. Anything can be used as the light reflection particle body 182 as long as it is a particle that reflects light. It may be glass beads scattered in a transmissive body.

According to the present variation example, as indicated by a circle 181 depicted by an alternating long- and short-dashed line, a portion of light 184 is reflected, and another part is emitted to the outside through interspaces. Accordingly, it performs the same function as that of the second radiation side reflection means 140 having the micro-hole group 142. Also, it is possible to uniformize the amount of the emitted light with a light diffusion concave-convex structure part formed on the entirety of the reflection plane. An object obtained by performing the sand blasting process on a plane of glass is appropriate. Also, a plane processing that brings the effect of the diffraction grating may be performed. In other words, by configuring the entirety of the reflection plane by using a light diffraction grating, the amount of the emitted light can be uniformized.

Also, in the above embodiment, it is desirable that the first radiation side reflection means 120 have the opening group 125 distributed on the first reflection plane 121 in such a manner that the particular point is the center of the symmetry and also that the longer the distance from the particular point, the greater the sum of the areas of the openings in a unit area. As the length from the center point becomes greater, the amount of light transmitted through the holes increases so that the entirety of the light is obtained and the light is uniform light. When the configuration using the radiation side reflection means as shown in the previous embodiment is employed, the uniformity of the amount of the emitted light further increases. Also, the first radiation side reflection means 120 and the second radiation side reflection means 140 can be of the same configuration as this.

In the above embodiment, the light that has been repeatedly reflected in a manner of the multipath reflection is emitted to the outside. We examined to what extent the multipath reflection had to be caused by using the second radiation side reflection means 140 in order to uniformize the amount of the emitted light. We obtained the result as below. It is desirable that the third reflection plane 141 of the second radiation side reflection means 140 reflect at least seventy percent of the incident light when the reflection loss is assumed to be zero.

When the reflection loss is assumed to be zero and an object that reflects at least seventy percent of the incident light is used, the multipath reflection function of the second radiation side reflection means 140 can be utilized sufficiently. When it is less than seventy percent, the uniformization of the amount of light is not sufficient, and it is better to omit the second radiation side reflection means 140 in view of cost.

Twenty Second Embodiment

FIG. 30 shows a longitudinal cross section of the planar illumination light source device 100 according to the present embodiment.

The planar illumination light source device 100 including radiation side reflection means 190 having a uniform light scattering plane and light transmissive holes on the radiation plane 104 of the light guiding body 103. In other words, an object in the same configuration as the second radiation side reflection means 140 of the respective embodiments shown in FIGS. 26 through 29 is used as the radiation side reflection means 190, and the multipath reflection is caused only in the light guiding body 103. Thereby, it is possible to provide a much simplified planar light source at low cost.

FIG. 31 shows the effect of the second radiation side reflection means 140 shown in FIG. 18.

The horizontal axis represents the positional coordinate of the radiation plane 104 of a planar illumination light source device 100, and the vertical axis represents the amount of the emitted light.

As shown in the figure, when only the first radiation side reflection means 120 is used, the emitted light amount P varies, being affected by the pitch of the opening. When the second radiation side reflection means 140 is also used, the emitted light amount Q is very uniform over its entirety.

FIGS. 32A through 32D show patterns of the openings of the first radiation side reflection means 120 that are practical. The arrangements and the shapes of the opening group 125 of the first radiation side reflection means 120 slightly vary between the figures; however, all of them cause the emitted light amount to be uniform to such an extent that there is no problem practically.

The invention claimed is:

1. A planer illumination light source device comprising:
a highly directional point-light source;
a casing having a bottom plane and a side plane of prescribed sizes, and formed with an opening, the casing having, at an inner wall surface thereof, an inside reflection part and a side reflection part that reflect or irregularly reflect light; and
radiation side reflection means that covers the opening and transmits, reflects or irregularly reflects light, wherein
the casing is provided with the point-light source arranged at the center of the bottom plane thereof,
the radiation side reflection means has a central reflection part in a prescribed area at a spot immediately above the point-light source and an outward reflection part arranged at an outer periphery of the central reflection part, the outward reflection part is formed of a reflection member having a prescribed reflectance that transmits, reflects, or irregularly reflects a part of light, and the central reflection part is formed of a light transmissive reflection member having a higher reflectance than that of the outward reflection part.

2. The planer illumination light source device according to claim 1, wherein a reflectance of the outward reflection part is set within a range of 75% to 99.3%.

3. The planer illumination light source device according to claim 1, wherein the point-light source is formed of a light emitting diode group consisting of one or a plurality of light emitting diodes.

4. The planer illumination light source device according to claim 1, wherein the central reflection part has a slit or an opening at a part thereof, or the central reflection part is made thin.

5. The planer illumination light source device according to claim 1, wherein the outward reflection part has a slit that makes the amount of light transmitted therethrough increase as a distance from the central reflection part increases.

6. The planer illumination light source device according to claim 1, wherein both the central reflection part and the outward reflection part are formed of reflection dots and the central reflection part consists of reflection dots of a higher density distribution than that of reflection dots of the outward reflection part.

7. The planer illumination light source device according to claim 1, wherein the casing is rectangle.

8. The planer illumination light source device according to claim 7, wherein the side plane of the casing extends outward from an end of the bottom plane.

9. The planer illumination light source device according to claim 1, wherein the inside reflection part, the side reflection part, and the radiation side reflecting means are ultrafinely foamed reflection members.

10. The planer illumination light source device according to claim 1, wherein the inside reflection part and the side reflection part are ultrafinely foamed reflection members and the radiation side reflecting means is an application film containing particulates of titanium white or poly fluoro carbon.

11. The planer illumination light source device according to claim 1, wherein the inside reflection part and the side reflection part are application films containing particulates of titanium white or poly fluoro carbon and the radiation side reflecting means is an application film containing particulates of poly fluoro carbon.

12. The planer illumination light source device according to claim 1, wherein the casing is provided with a plurality of such point-light sources arranged inside and the radiation side reflecting means is arranged immediately above each of the point-light sources.

13. The planer illumination light source device according to claim 1, wherein an interior of the casing is divided into a plurality of blocks, one point-light source is arranged at the center of the bottom plane of each of the divided blocks, and the radiation side reflecting means is arranged immediately above each of the point-light sources.

14. The planer illumination light source device according to claim 12, wherein the point-light source includes light emitting elements of red, blue, and green.

15. The planer illumination light source device according to claim 14, wherein the point-light source includes light emitting elements of red, blue, and green.

16. A planer illumination device comprising a plurality of planer illumination light source devices as claimed in claim 1.

* * * * *